US008817389B2

(12) United States Patent
Tsai et al.

(10) Patent No.: US 8,817,389 B2
(45) Date of Patent: Aug. 26, 2014

(54) OPTICAL LENS ASSEMBLY FOR IMAGE TAKING

(71) Applicant: LARGAN Precision Co., Ltd., Taichung (TW)

(72) Inventors: Tsung-Han Tsai, Taichung (TW); Wei-Yu Chen, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 88 days.

(21) Appl. No.: 13/670,043

(22) Filed: Nov. 6, 2012

(65) Prior Publication Data

US 2014/0016211 A1   Jan. 16, 2014

(30) Foreign Application Priority Data

Jul. 13, 2012   (TW) .............................. 101125413 A

(51) Int. Cl.
| | | |
|---|---|---|
| G02B 3/02 | (2006.01) | |
| G02B 13/18 | (2006.01) | |
| G02B 9/34 | (2006.01) | |
| G02B 13/00 | (2006.01) | |

(52) U.S. Cl.
CPC ................ *G02B 13/004* (2013.01); *G02B 9/34* (2013.01)
USPC ............................ 359/715; 359/708; 359/773

(58) Field of Classification Search
USPC ......................................... 359/715, 774, 773
See application file for complete search history.

(56) References Cited

U.S. PATENT DOCUMENTS

| | | | |
|---|---|---|---|
| 7,145,736 B2 | 12/2006 | Noda | |
| 7,969,664 B2 | 6/2011 | Tang et al. | |
| 8,320,060 B2 | 11/2012 | Jo | |
| 8,614,856 B2 * | 12/2013 | Ise et al. ........................ | 359/715 |
| 8,665,538 B2 * | 3/2014 | Chung et al. .................... | 359/773 |
| 2007/0188890 A1 * | 8/2007 | Jo et al. .......................... | 359/773 |
| 2009/0109549 A1 * | 4/2009 | Yasuhiko ....................... | 359/715 |
| 2010/0097709 A1 * | 4/2010 | Tsai ............................... | 359/715 |
| 2011/0249171 A1 * | 10/2011 | Shigemitsu et al. ........... | 348/340 |
| 2012/0002302 A1 * | 1/2012 | Cho ............................... | 359/715 |
| 2012/0069239 A1 * | 3/2012 | Ohki .............................. | 348/345 |
| 2013/0063827 A1 * | 3/2013 | Hsu et al. ....................... | 359/715 |
| 2013/0070348 A1 * | 3/2013 | Ise et al. ........................ | 359/715 |
| 2013/0208171 A1 * | 8/2013 | Lai ................................. | 348/340 |

* cited by examiner

*Primary Examiner* — Thomas K Pham
*Assistant Examiner* — Nicholas Pasko
(74) *Attorney, Agent, or Firm* — Morris Manning & Martin LLP; Tim Tingkang Xia, Esq.

(57) ABSTRACT

An optical lens assembly for image taking includes a first lens element, a second lens element, a third lens element and a fourth lens element. The first lens element with positive refractive power includes a convex object-side surface at a paraxial region. The second lens element with negative refractive power includes a concave object-side surface at a paraxial region. The third lens element with refractive power includes a concave object-side surface at a paraxial region and a convex image-side surface at a paraxial region. The fourth lens element made of plastic with negative refractive power includes a concave object-side surface at a paraxial region and an image-side surface. At least one of the object-side surface and the image-side surface of the fourth lens element is aspheric, and the image-side surface of the fourth lens element is concave at a paraxial region and convex at a peripheral region.

23 Claims, 16 Drawing Sheets

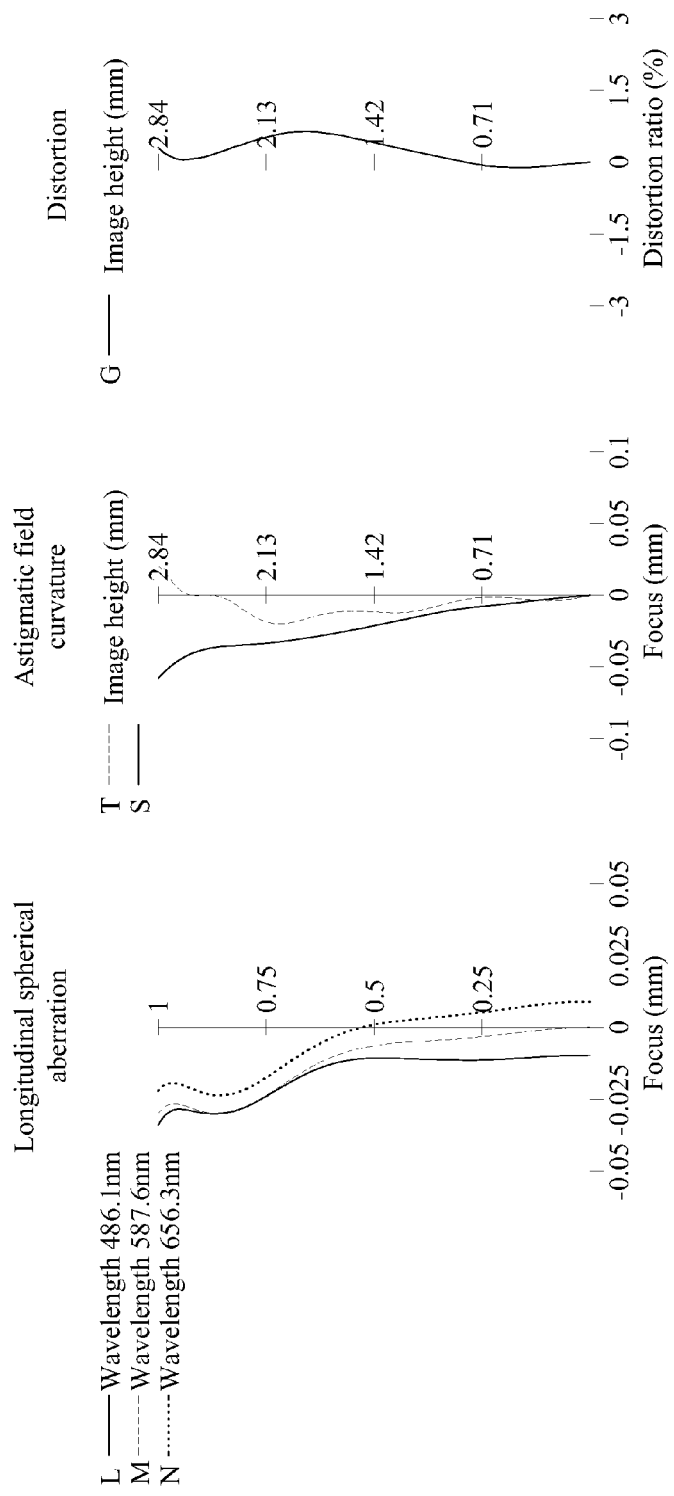

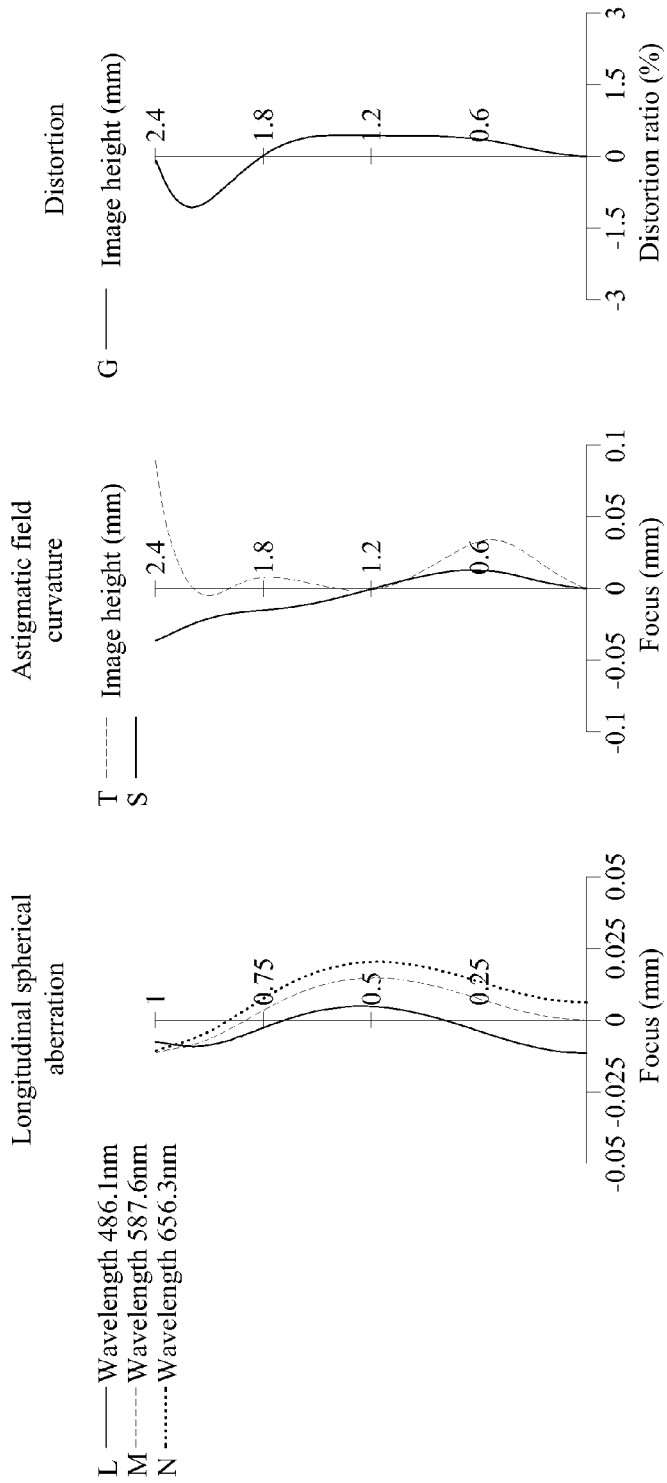

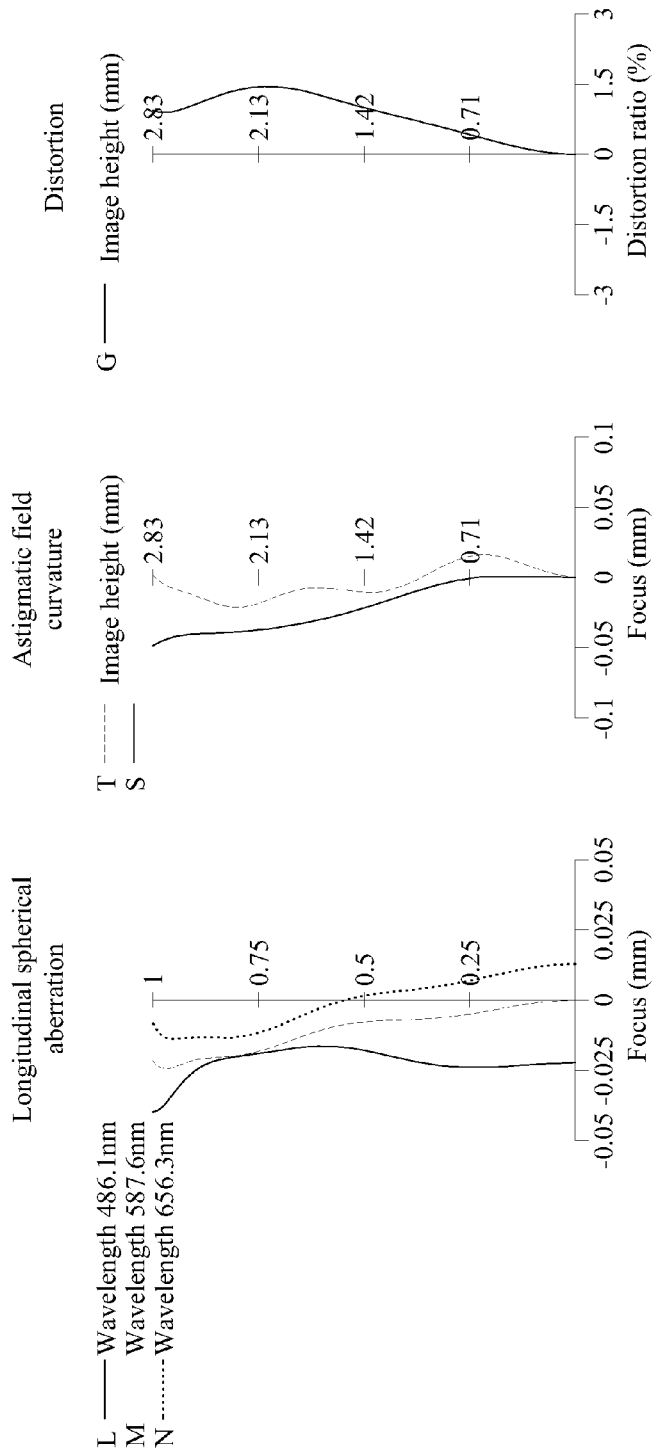

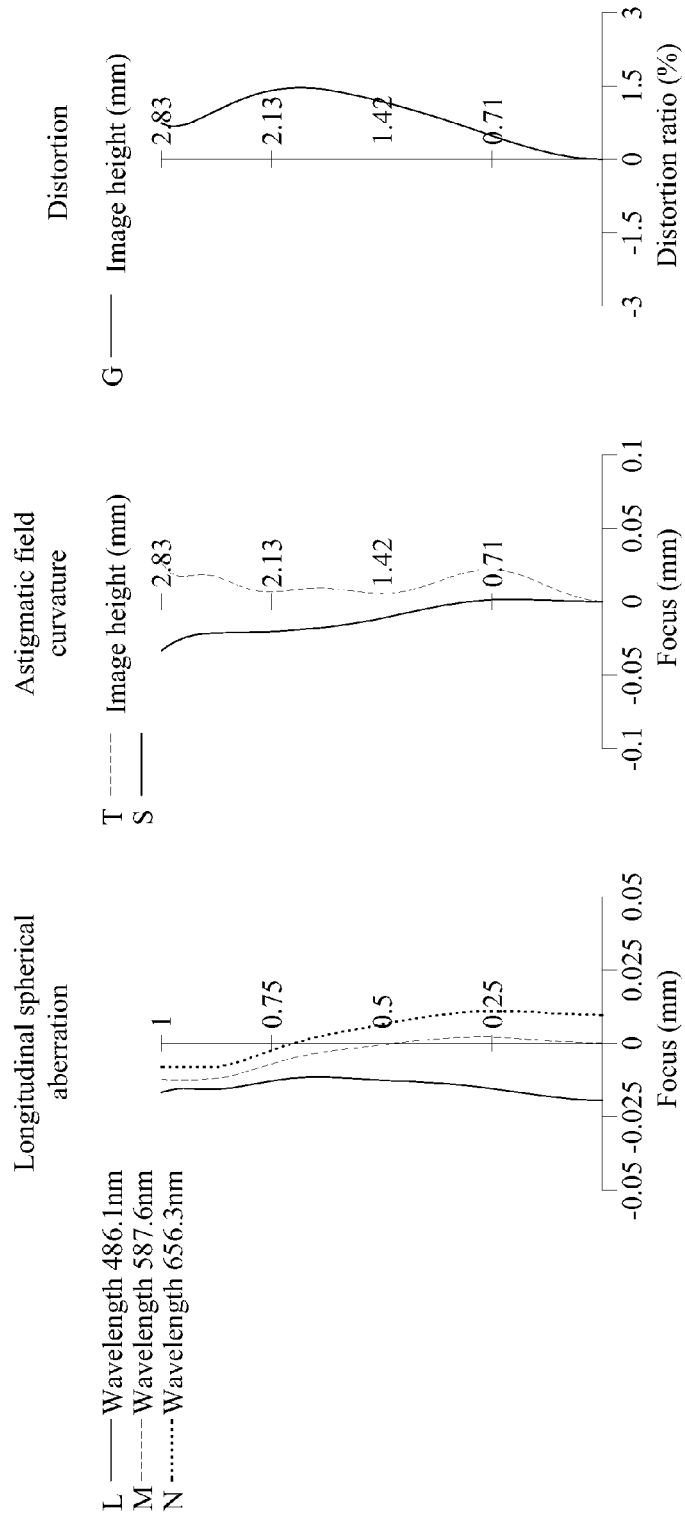

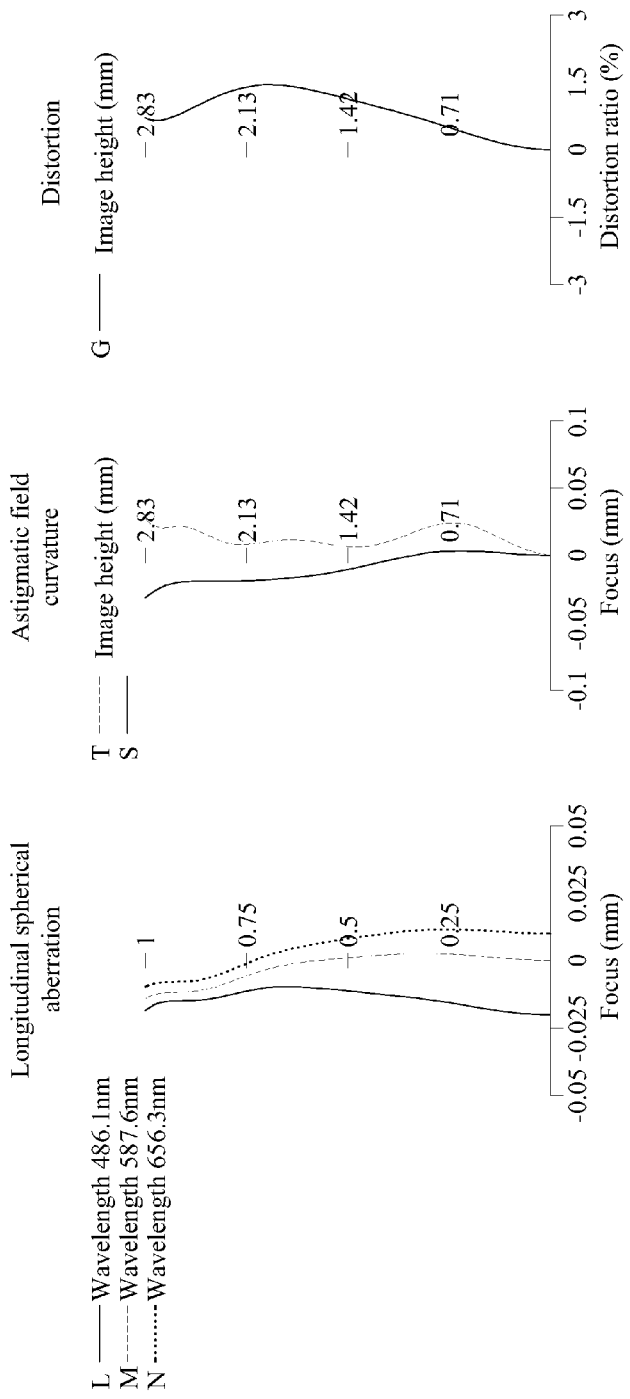

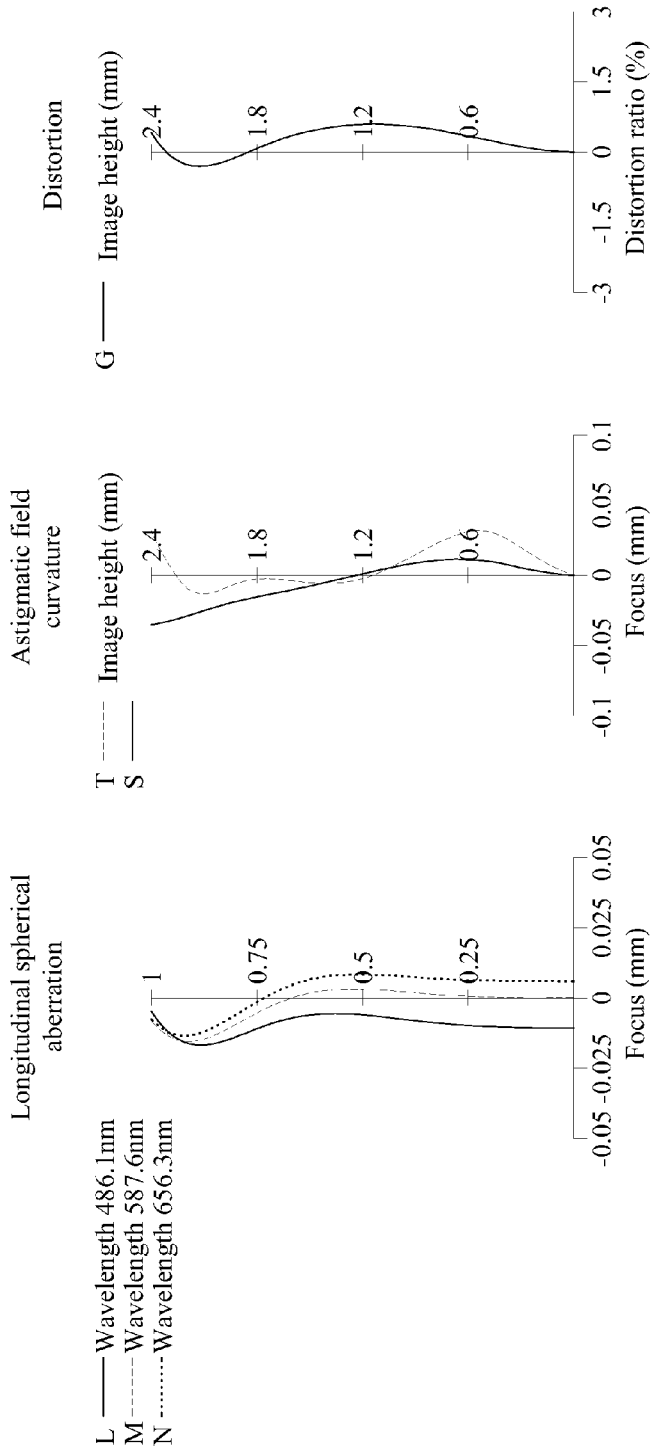

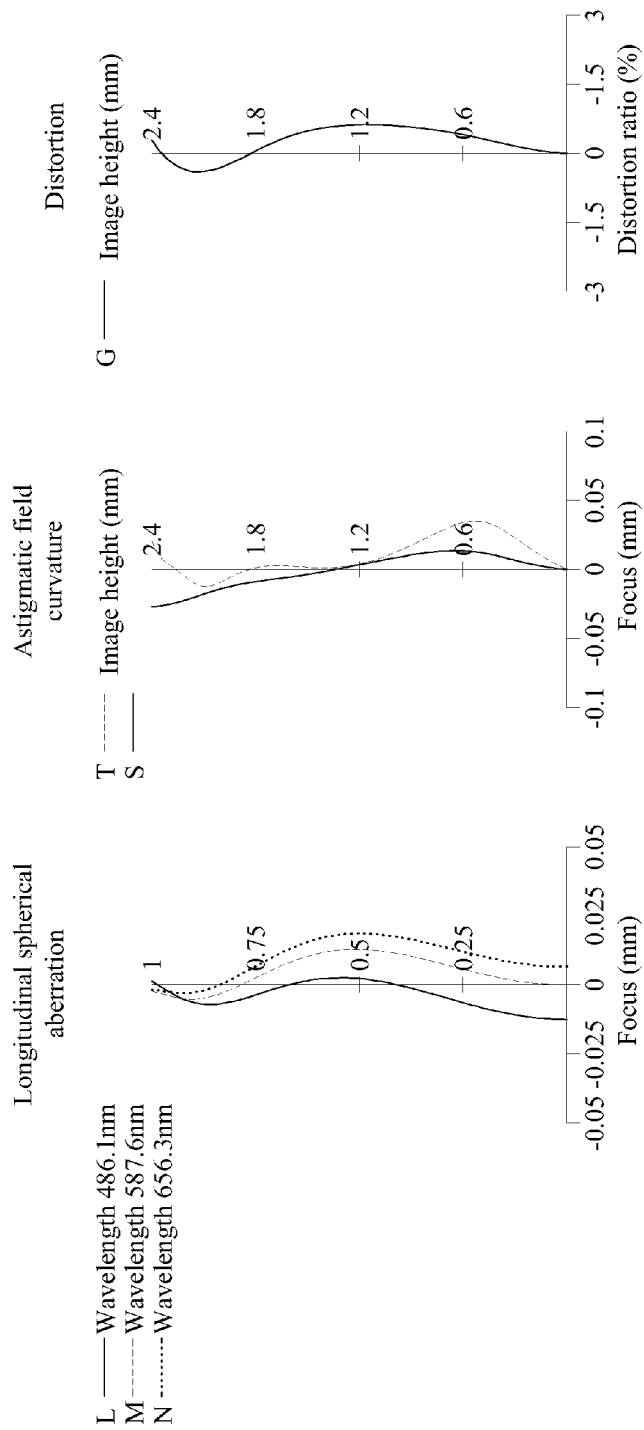

OPTICAL LENS ASSEMBLY FOR IMAGE TAKING

CROSS-REFERENCE TO RELATED APPLICATIONS

This non-provisional application claims priority under 35 U.S.C. §119(a) on Patent Application No(s). 101125413 filed in Taiwan, R.O.C. on Jul. 13, 2012, the entire contents of which are hereby incorporated by reference.

BACKGROUND OF THE INVENTION

1. Technical Field

The present disclosure relates to an optical lens assembly for image taking, and more particularly, to an optical lens assembly for image taking having multiple lens elements.

2. Related Art

In recent years, with the rise of portable electronic device with photographing capability, the demand for compact imaging lens assembly has been increasing. The photo-sensing device of an ordinary photographing camera is none other than a CCD (charge coupled device) or a CMOS (complementary metal-oxide semiconductor sensor). Furthermore, as advances in semiconductor manufacturing technology have allowed the pixel size of sensors to be reduced, and the resolution of the compact imaging lens assembly has gradually increased, there is an increasing demand for the compact imaging lens assembly featuring better image quality. A three-lens structure is commonly adopted in a conventional compact photographing lens assembly of the portable electronic products. For example, in U.S. Pat. No. 7,145,736, a photographing lens assembly includes, in order from an object side to an image side, a first lens element with positive refractive power, a second lens element with negative refractive power and a third lens element with positive refractive power. With the advances of semiconductor manufacturing technology and the development of compact electronic devices, image quality of the compact imaging lens assembly is highly required but the conventional three-lens photographing lens assembly may not satisfy the demand for better image quality.

Moreover, the specification of U.S. Pat. No. 7,969,664 discloses a four-lens assembly. Although with the addition of a fourth lens element, the image quality is superior to the conventional three-lens photographing lens assembly. However, since the third lens element with positive refractive power is favorable for reducing the total track length of this four-lens assembly, the image quality may not satisfy the high-end imaging lens assembly for having larger aberration.

SUMMARY OF THE INVENTION

According to an embodiment, an optical lens assembly for image taking comprises, in order from an object side to an image side, a first lens element with positive refractive power comprising a convex object-side surface at a paraxial region and an image-side surface, a second lens element with negative refractive power comprising a concave object-side surface at a paraxial region and an image-side surface, a third lens element with refractive power comprising a concave object-side surface at a paraxial region and a convex image-side surface at a paraxial region, and a fourth lens element made of plastic with negative refractive power comprising a concave object-side surface at a paraxial region and a concave image-side surface at a paraxial region. The image-side surface of the fourth lens element is convex at a peripheral region. At least one of the object-side surface and the image-side surface of the fourth lens element is aspheric.

The optical lens assembly for image taking satisfies the following conditions:

$$1.45 < T_{23}/CT_3 < 3.0$$

$$-0.15 < R_1/R_2 < 0.50$$

$$0.70 < Dr_1r_4/T_{23} < 1.08$$

wherein $T_{23}$ is an axial distance between the second lens element and the third lens element; $CT_3$ is a central thickness of the third lens element; $R_1$ is a curvature radius of the object-side surface of the first lens element; $R_2$ is a curvature radius of the image-side surface of the first lens element; and $Dr_1r_4$ is an axial distance between the object-side surface of the first lens element and the image-side surface of the second lens element.

According to another embodiment, an optical lens assembly for image taking comprises, in order from an object side to an image side, a first lens element with positive refractive power comprising a convex object-side surface at a paraxial region and an image-side surface, a second lens element with negative refractive power comprising a concave object-side surface at a paraxial region and an image-side surface, a third lens element with refractive power comprising a concave object-side surface at a paraxial region and a convex image-side surface at a paraxial region, and a fourth lens element made of plastic with negative refractive power comprising a concave object-side surface at a paraxial region and a concave image-side surface at a paraxial region. The image-side surface of the fourth lens element is convex while at a peripheral region. At least one of the object-side surface and the image-side surface of the fourth lens element is aspheric.

The optical lens assembly for image taking comprises a stop and satisfies the following conditions:

$$1.50 \leq T_{23}/CT_3 < 2.05$$

$$-0.33 < R_1/R_2 < 0.50$$

$$0.70 < Dsr_4/Dr_1r_4 < 0.90$$

wherein $T_{23}$ is an axial distance between the second lens element and the third lens element; $CT_3$ is a central thickness of the third lens element; $R_1$ is a curvature radius of the object-side surface of the first lens element; $R_2$ is a curvature radius of the image-side surface of the first lens element; $Dsr_4$ is an axial distance between the stop and the image-side surface of the second lens element; and $Dr_1r_4$ is an axial distance between the object-side surface of the first lens element and the image-side surface of the second lens element.

BRIEF DESCRIPTION OF THE DRAWINGS

The present disclosure will become more fully understood from the following detailed description when taken in connection with the accompanying drawings, which show, for purpose of illustrations only, and thus do not limit other possible embodiments derived from the spirit of the present disclosure, and wherein:

FIG. 1B, FIG. 1C, FIG. 1D are schematic views of longitudinal spherical aberration curves, astigmatic field curves, and a distortion curve, respectively in the optical lens assembly for image taking in FIG. 1A;

FIG. 3B, FIG. 3C, FIG. 3D are schematic views of longitudinal spherical aberration curves, astigmatic field curves, and a distortion curve, respectively in the optical lens assembly for image taking in FIG. 3A;

FIG. 4B, FIG. 4C, FIG. 4D are schematic views of longitudinal spherical aberration curves, astigmatic field curves, and a distortion curve, respectively in the optical lens assembly for image taking in FIG. 4A;

FIG. 5B, FIG. 5C, FIG. 5D are schematic views of longitudinal spherical aberration curves, astigmatic field curves, and a distortion curve, respectively in the optical lens assembly for image taking in FIG. 5A;

FIG. 6B, FIG. 6C, FIG. 6D are schematic views of longitudinal spherical aberration curves, astigmatic field curves, and a distortion curve, respectively in the optical lens assembly for image taking in FIG. 6A;

FIG. 7B, FIG. 7C, FIG. 7D are schematic views of longitudinal spherical aberration curves, astigmatic field curves, and a distortion curve, respectively in the optical lens assembly for image taking in FIG. 7A;

FIG. 8B, FIG. 8C, FIG. 8D are schematic views of longitudinal spherical aberration curves, astigmatic field curves, and a distortion curve, respectively in the optical lens assembly for image taking in FIG. 8A.

DETAILED DESCRIPTION OF THE INVENTION

Figure 1A:
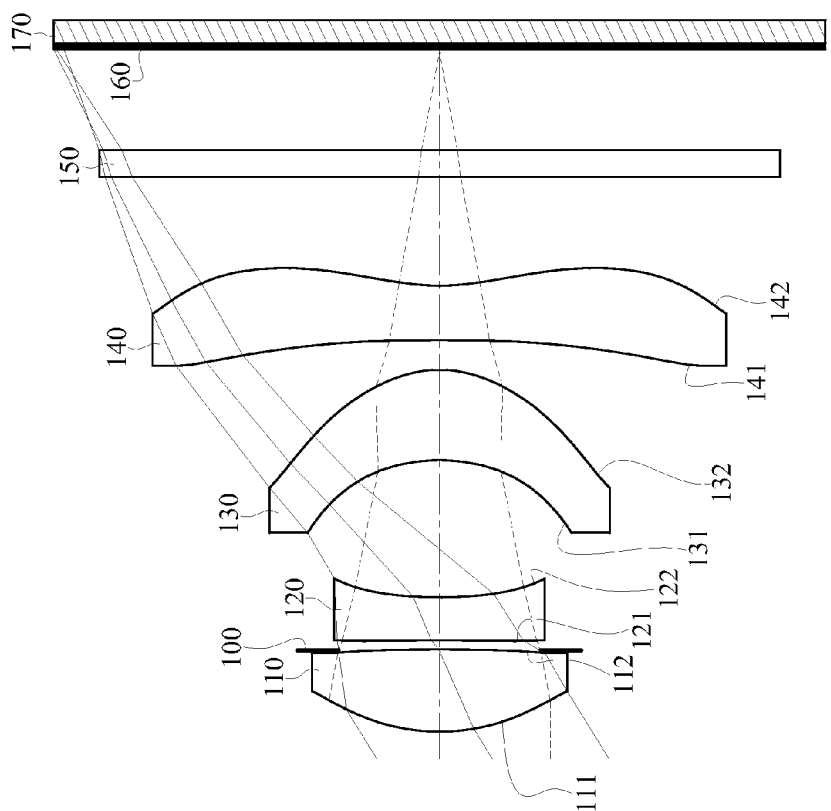
FIG. 1A is a schematic structural view of a first embodiment of an optical lens assembly for image taking.

The optical lens assembly for image taking of the present disclosure is described to illustrate that the embodiments have similar lens combinations, configuration relationships, and the same conditions of the optical lens assembly. The differences are described in detail in the following embodiments.

The optical lens assembly for image taking comprises, from an object side to an image side along an optical axis in sequence, a first lens element, a stop, a second lens element, a third lens element, a fourth lens element, an IR-cut filter (infrared-cut filter) and an image plane including an image sensor. The stop can be an aperture stop.

The object-side surface of the first lens element with positive refractive power may be convex at a paraxial region for providing a portion of the positive refractive power of the optical lens assembly for image taking, thereby shortening the total length of the optical lens assembly for image taking.

The object-side surface of the second lens element with negative refractive power may be concave at a paraxial region for correcting the aberration resulted from the first lens element effectively as well as the chromatism of the optical lens assembly for image taking.

The object-side surface of the third lens element is concave at a paraxial region and the image-side surface of the third lens element is convex at a paraxial region for correcting the astigmatism of the optical lens assembly for image taking.

The object-side surface of the fourth lens element made of plastic is concave at a paraxial region. The image-side surface of the fourth lens element is concave at a paraxial region and convex at a peripheral region. Thus, the angle at which the incident light projects onto the image sensor from off-axis field can be effectively reduced and the off-axis aberration is further corrected. The object-side surface and the image-side surface of the fourth lens element both are aspheric. The fourth lens element made of plastic with negative refractive power so the principal point of the optical lens assembly for image taking is farther away from the image plane and the total track length of the optical lens assembly for image taking is favorably reduced for keeping the optical lens assembly for image taking compact.

$T_{23}$ is an axial distance between the second lens element and the third lens element and $CT_3$ is a central thickness of the third lens element. When the second lens element and the third lens element satisfy $1.45 \leq T_{23}/CT_3 < 3.0$, the heights in which the lights from the off-axis field pass through the second lens element and the third lens element are relatively higher so that it enables the third lens element to correct the field curve, the distortion and the comatic aberration for favorably correcting the image quality. When the relation of $1.50 \leq T_{23}/CT_3 < 2.05$ is satisfied, it is favorable for the aforementioned condition. In some embodiments, the following relation is satisfied: $1.50 \leq T_{23}/CT_3 < 1.80$.

$R_1$ is a curvature radius of the object-side surface of the first lens element and $R_2$ is a curvature radius of the image-side surface of the first lens element. When the first lens element satisfies $-0.33 < R_1/R_2 < 0.50$, the spherical aberration resulted from the optical lens assembly for image taking is corrected. In some embodiments, the following relation is satisfied: $-0.15 < R_1/R_2 < 0.50$.

$Dr_1r_4$ is an axial distance between the object-side surface of the first lens element and the image-side surface of the second lens element and $T_{23}$ is the axial distance between the second lens element and the third lens element. When the relation of $0.70 < Dr_1r_4/T_{23} < 1.08$ is satisfied, it is favorable for adjusting the aberration of the optical lens assembly for image taking while keeping a proper total track of length for the lens assembly.

$Dr_1r_4$ is the axial distance between the object-side surface of the first lens element and the image-side surface of the second lens element and $Dsr_4$ is an axial distance between the stop and the image-side surface of the second lens element. When the relation of $0.30 < Dsr_4/Dr_1r_4 < 0.90$ is satisfied, it is favorable for providing a proper field of angle and lowering the incident angle of the image plane to provide better image quality. In some embodiments, the following relation is satisfied: $0.30 < Dsr_4/Dr_1r_4 < 0.60$.

$V_1$ is an Abbe number of the first lens element and $V_2$ is an Abbe number of the second lens element. When the first lens element and the second lens element satisfy $1.8 < V_1/V_2 < 3.0$, it is favorable for correcting the chromatism generated by the optical lens assembly for image taking.

$SAG_{32}$ is a distance in parallel with the optical axis from the maximum effective diameter position on the image-side surface of the third lens element to an on-axis vertex on the image-side surface of the third lens element and $CT_3$ is the central thickness of the third lens element. When the relation of $1.2 < |SAG_{32}|/CT_3 < 1.5$ is satisfied, the angle of incidence onto the image sensor from the off-axis field is reduced and the off-axis aberration is corrected.

$R_7$ is a curvature radius of the object-side surface of the fourth lens element; and $R_8$ is a curvature radius of the image-side surface of the fourth lens element. When the fourth lens element satisfies $0.75 < (R_7+R_8)/(R_7-R_8) < 1.0$, the lens shape of the fourth lens element is maintained, which is favorable for correcting the high order aberration generated by the optical lens assembly for image taking.

f is a focal length of the optical lens assembly for image taking; $f_1$ is a focal length of the first lens element; $f_2$ is a focal length of the second lens element; $f_3$ is a focal length of the third lens element; and $f_4$ is a focal length of the fourth lens element. When the relation of $0.7<(f/f_1)+(f/f_2)+(f/f_3)+(f/f_4)<1.0$ is satisfied, the arrangement of the first lens element, the second lens element, the third lens element and the fourth lens element is much more proper, thereby it is favorable for reducing the sensitivity and the aberration of the optical lens assembly for image taking.

$f_1$ is the focal length of the first lens element; $f_2$ is the focal length of the second lens element. When the first lens element and the second lens element satisfy $-0.6<f_1/f_2<-0.2$, it is favorable for correcting the aberration to enhance the image quality.

$CT_2$ is a central thickness of the second lens element. When the second lens element satisfies 0.10 millimeters (mm)<$CT_2$<0.25 mm, it is favorable for reducing the complexity of manufacturing the second lens element while keeping the optical lens assembly compact.

In the optical lens assembly for image taking according to the disclosure, the materials of the lens elements may be plastic or glass. When the material of the lens element is plastic, the manufacturing cost may be effectively reduced. Otherwise, when the material of the lens element is glass, the freedom for distributing the refractive power of the optical lens assembly for image taking is increased. Moreover, the surface shape of the lens elements can be easily made into non-spherical profiles, allowing more design parameter freedom which can be used to reduce the aberrations and the total number of the lens elements used in an optical lens assembly. Consequently, the total track length of the optical lens assembly for image taking may be shortened effectively.

In addition, each object-side surface and each image-side surface of every lens element has a paraxial region and a peripheral region. The paraxial region refers to the region of the surface where rays travel close to or near the optical axis and the peripheral region refers to the region of the surface where rays travel away from the optical axis. Particularly, a convex surface means the surface at a paraxial region is convex; a concave surface means the surface at a paraxial region is concave.

In the present optical lens assembly for image taking, there can be at least one stop provided, such as an aperture stop, a glare stop or a field stop. Said glare stop or said field stop is used for eliminating the stray light and thereby improving the image resolution thereof.

In the present optical lens assembly for image taking, the aperture stop can be configured as a front stop or a middle stop. A front stop can provide a longer distance between an exit pupil of the system and an image plane and which improves the image-sensing efficiency of an image sensor of CCD or CMOS. A middle stop is favorable for expanding the field of view of the assembly and thereby provides a wider field of view for the same.

As for the optical lens assembly for image taking, the specific schemes are further described with the following embodiments. Parameters in the embodiments are defined as follows. The aspheric surface in the embodiments may be represented by, but not limited to, the following aspheric surface equation (Formula ASP):

$$X(Y) = (Y^2/R)/(1 + sqrt(1-(1+k)*(Y/R)^2)) + \sum_i (Ai)*(Y^i)$$

wherein X is the relative distance between a point on the aspheric surface at a distance Y from the optical axis and the tangential plane at the aspheric surface vertex, Y is the distance from the point on the curve of the aspheric surface to the optical axis, k is a conic factor, Ai is an $i^{th}$ order aspheric surface coefficient, R is the curvature radius, and in the embodiments, i may be, but is not limited to, 4, 6, 8, 10, 12, 14 and 16.

The First Embodiment (Embodiment 1)

Referring to FIGS. 1A to 1D, the optical lens assembly for image taking 1 of the first embodiment comprises, from an object side to an image side along an optical axis (from left to right in FIG. 1A) in sequence, a first lens element 110, an aperture stop 100, a second lens element 120, a third lens element 130, a fourth lens element 140, an IR-cut filter (infrared-cut filter) 150 and an image plane 160 including an image sensor 170.

The first lens element 110 made of plastic with positive refractive power having a convex object-side surface 111 at a paraxial region, a convex image-side surface 112 at a paraxial region, and the object-side and image-side surfaces 111 and 112 thereof being aspheric. The second lens element 120 made of plastic with negative refractive power having an object-side surface 121 being concave at a paraxial region and convex at a peripheral region, a concave image-side surface 122 at a paraxial region, and the object-side and image-side surfaces 121 and 122 thereof being aspheric. The third lens element 130 made of plastic with positive refractive power having a concave object-side surface 131 at a paraxial region, a convex image-side surface 132 at a paraxial region, and the object-side and image-side surfaces 131 and 132 thereof being aspheric. The fourth lens element 140 made of plastic with negative refractive power having a concave object-side surface 141 at a paraxial region, an image-side surface 142 being concave at a paraxial region and convex at a peripheral region, and the object-side and image-side surfaces 141 and 142 thereof being aspheric.

In this embodiment, the reference wavelength of the incident light ray on the optical lens assembly for image taking 1 is 587.6 nm. However, the reference wavelength of the light does not intend to limit the disclosure. In some embodiments, light with different wavelength can be utilized for demonstrations of different purposes.

The detailed data of the optical lens assembly for image taking 1 is as shown in Table 1-1 below:

TABLE 1-1

Embodiment 1
f = 4.58 mm, Fno = 2.85, HFOV = 31.7 deg.

| Surface # | | Curvature radius (mm) | Thickness (mm) | Material | Index | Abbe # | Focal length (mm) |
|---|---|---|---|---|---|---|---|
| 0 | Object | — | Plano Infinity | — | — | — | — |
| 1 | Lens 1 | 1.467 | ASP 0.605 | Plastic | 1.544 | 55.9 | 2.63 |

TABLE 1-1-continued

Embodiment 1
f = 4.58 mm, Fno = 2.85, HFOV = 31.7 deg.

| Surface # | | Curvature radius (mm) | | Thickness (mm) | Material | Index | Abbe # | Focal length (mm) |
|---|---|---|---|---|---|---|---|---|
| 2 | | −50.000 | ASP | −0.007 | | | | |
| 3 | Ape. Stop | — | Plano | 0.075 | — | — | — | — |
| 4 | Lens 2 | −27.502 | ASP | 0.316 | Plastic | 1.632 | 23.4 | −4.71 |
| 5 | | 3.354 | ASP | 1.009 | | | | |
| 6 | Lens 3 | −1.371 | ASP | 0.666 | Plastic | 1.544 | 55.9 | 2.70 |
| 7 | | −0.830 | ASP | 0.218 | | | | |
| 8 | Lens 4 | −21.009 | ASP | 0.400 | Plastic | 1.530 | 55.8 | −2.70 |
| 9 | | 1.545 | ASP | 0.800 | | | | |
| 10 | IR-cut filter | — | Plano | 0.200 | Glass | 1.517 | 64.2 | — |
| 11 | | — | Plano | 0.740 | | | | |
| 12 | Image Plane | — | Plano | — | — | — | — | — |

Note:
Reference wavelength is d-line 587.6 nm, and ASP represents aspheric.

In Table 1-1, from the object-side surface 111 to the image-side surface 142, all the surfaces can be aspheric, and the aspheric surfaces can satisfy Formula ASP, but are not limited thereto. As for the parameters of the aspheric surfaces, reference is made to Table 1-2 below:

TABLE 1-2

Aspheric Coefficients

| Surface# | 1 | 2 | 4 | 5 |
|---|---|---|---|---|
| k = | −3.7088E−01 | 1.0000E+01 | −1.0000E+01 | 5.0000E+00 |
| A4 = | 3.7722E−03 | −8.9123E−02 | −1.7312E−02 | 7.4259E−02 |
| A6 = | −7.9788E−03 | 7.9461E−02 | 6.4881E−02 | 3.8014E−02 |
| A8 = | −6.7303E−03 | −6.6730E−02 | 1.8385E−01 | 5.5458E−02 |
| A10 = | −3.1265E−02 | 2.8203E−02 | −3.8755E−01 | — |
| A12 = | — | — | 3.0251E−01 | — |

| Surface# | 6 | 7 | 8 | 9 |
|---|---|---|---|---|
| k = | −2.9495E−01 | −3.0402E+00 | −2.0000E+01 | −1.4244E+01 |
| A4 = | −1.0615E−01 | −2.2064E−01 | −3.9648E−02 | −8.1878E−02 |
| A6 = | −1.0745E−01 | 9.2379E−02 | 1.9040E−02 | 3.7147E−02 |
| A8 = | 9.3646E−02 | −5.6822E−02 | −2.8517E−03 | −1.3669E−02 |
| A10 = | −3.3949E−02 | −8.5423E−03 | −4.6362E−04 | 2.6317E−03 |
| A12 = | 6.5307E−01 | 2.4266E−02 | −5.0089E−07 | −1.0546E−04 |
| A14 = | −5.1217E−01 | 5.0379E−03 | 6.9454E−05 | −5.2988E−05 |
| A16 = | 1.4300E−01 | −4.8686E−03 | −9.3417E−06 | 7.0521E−06 |

In Table 1-1, the curvature radius, the thickness and the focal length are shown in millimeters (mm). Surface numbers 0-12 represent the surfaces sequentially arranged from the object-side to the image-side along the optical axis. "f" stands for the focal length, "Fno" is the f-number, and "HFOV" is a half of maximal field of view of this embodiment. In Table 1-2, k represents the conic coefficient of the equation of the aspheric surface profiles. A1-A16 represent the aspheric coefficients ranging from the $1^{st}$ order to the $16^{th}$ order. All labels for Tables of the remaining embodiments share the same definitions as those in Table 1-1 and Table 1-2 of the first embodiment, and their definitions will not be stated again.

The content of Table 1-3 may be deduced from Table 1-1:

TABLE 1-3

Embodiment 1

| f (mm) | 4.58 | $(R_7 + R_8)/(R_7 − R_8)$ | 0.86 |
|---|---|---|---|
| Fno | 2.85 | $Dsr_4/Dr_1r_4$ | 0.40 |
| HFOV(deg.) | 31.7 | $Dr_1r_4/T_{23}$ | 0.98 |
| $V_1/V_2$ | 2.39 | $|SAG_{32}|/CT_3$ | 1.30 |
| $CT_2$ (mm) | 0.316 | $f_1/f_2$ | −0.558 |
| $T_{23}/CT_3$ | 1.515 | $f/f_1 + f/f_2 + f/f_3 + f/f_4$ | 0.772 |
| $R_1/R_2$ | −0.03 | — | — |

The Second Embodiment (Embodiment 2)

Figure 2A:
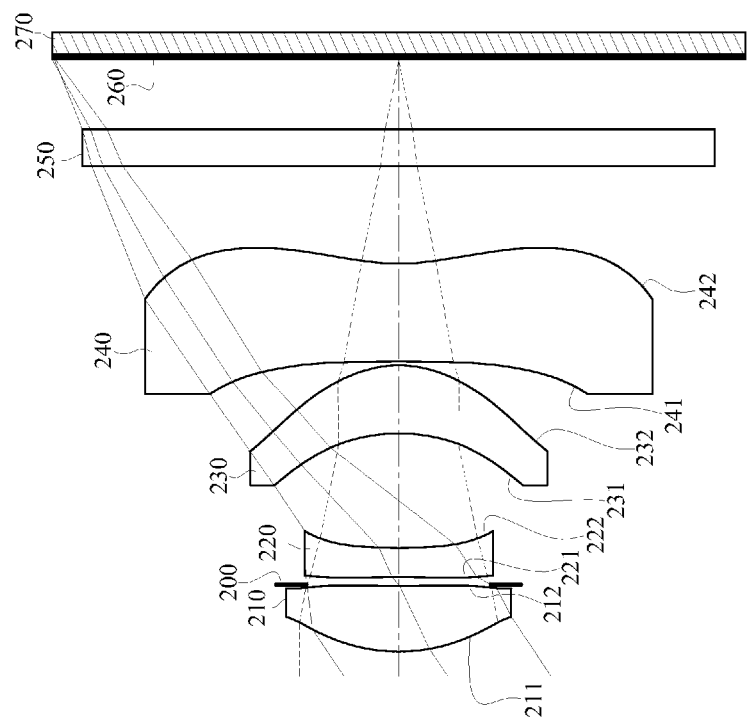
FIG. 2A is a schematic structural view of a second embodiment of an optical lens assembly for image taking.
Figures 2B, 2C, 2D:
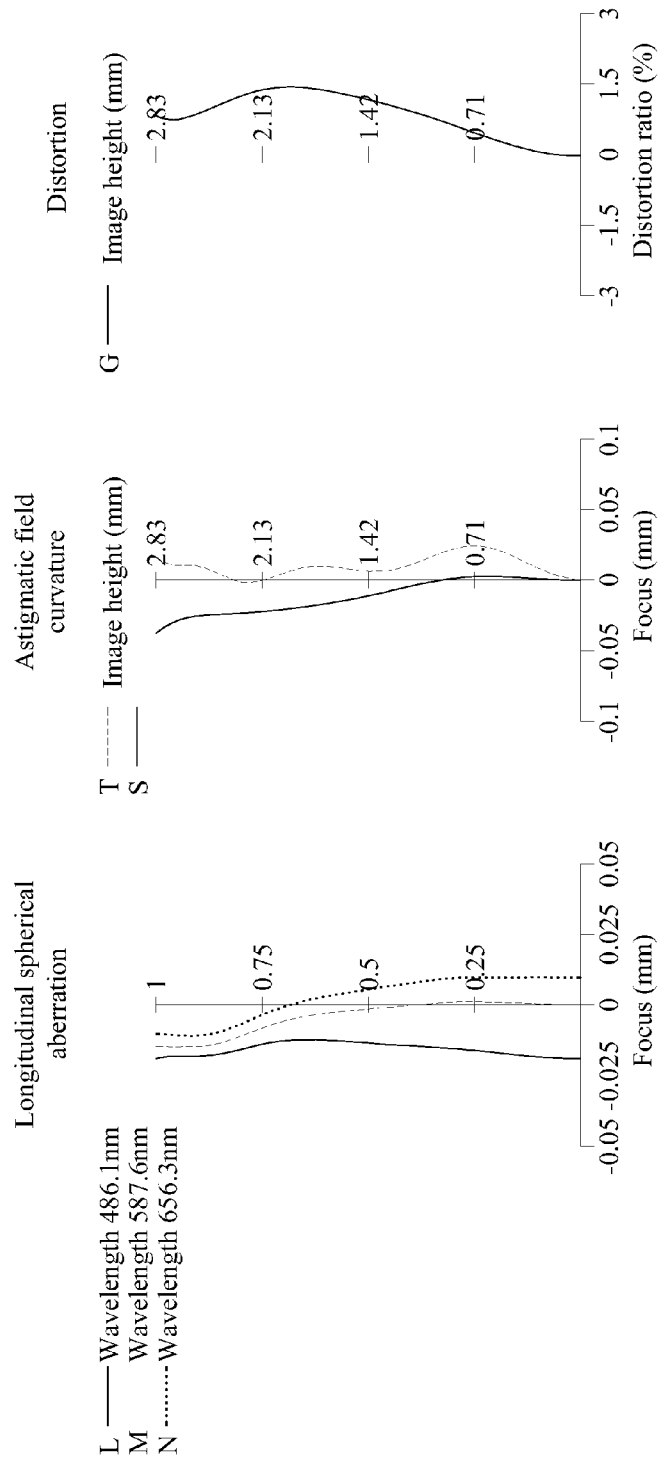
FIG. 2B, FIG. 2C, FIG. 2D are schematic views of longitudinal spherical aberration curves, astigmatic field curves, and a distortion curve, respectively in the optical lens assembly for image taking in FIG. 2A.

Referring to FIGS. 2A to 2D, the optical lens assembly for image taking 2 of the second embodiment comprises, from an object side to an image side along an optical axis in sequence, a first lens element 210, an aperture stop 200, a second lens element 220, a third lens element 230, a fourth lens element 240, an IR-cut filter 250 and an image plane 260 including an image sensor 270.

The first lens element 210 made of plastic with positive refractive power having a convex object-side surface 211 at a paraxial region, a concave image-side surface 212 at a paraxial region, and the object-side and image-side surfaces 211 and 212 thereof being aspheric. The second lens element 220 made of plastic with negative refractive power having an object-side surface 221 being concave at a paraxial region and convex at a peripheral region, a concave image-side surface 222 at a paraxial region, and the object-side and image-side surfaces 221 and 222 thereof being aspheric. The third lens element 230 made of plastic with positive refractive power having a concave object-side surface 231 at a paraxial region, a convex image-side surface 232 at a paraxial region, and the object-side and image-side surfaces 231 and 232 thereof being aspheric. The fourth lens element 240 made of plastic with negative refractive power having a concave object-side surface 241 at a paraxial region, an image-side surface 242 being concave at a paraxial region and convex at a peripheral region, and the object-side and image-side surfaces 241 and 242 thereof being aspheric.

The detailed data of the optical lens assembly for image taking 2 is as shown in Table 2-1 below:

TABLE 2-1

Embodiment 2
f = 4.22 mm, Fno = 2.60, HFOV = 33.7 deg.

| Surface # | | Curvature radius (mm) | | Thickness (mm) | Material | Index | Abbe # | Focal length (mm) |
|---|---|---|---|---|---|---|---|---|
| 0 | Object | — | Plano | Infinity | — | — | — | — |
| 1 | Lens 1 | 1.401 | ASP | 0.538 | Plastic | 1.544 | 55.9 | 2.83 |
| 2 | | 13.333 | ASP | 0.010 | | | | |
| 3 | Ape. Stop | — | Plano | 0.063 | — | — | — | — |
| 4 | Lens 2 | −21.882 | ASP | 0.240 | Plastic | 1.640 | 23.3 | −6.59 |
| 5 | | 5.240 | ASP | 0.937 | | | | |
| 6 | Lens 3 | −1.430 | ASP | 0.558 | Plastic | 1.544 | 55.9 | 3.29 |
| 7 | | −0.904 | ASP | 0.030 | | | | |
| 8 | Lens 4 | −96.154 | ASP | 0.802 | Plastic | 1.544 | 55.9 | −3.17 |
| 9 | | 1.764 | ASP | 0.800 | | | | |
| 10 | IR-cut filter | — | Plano | 0.300 | Glass | 1.517 | 64.2 | — |
| 11 | | — | Plano | 0.574 | | | | |
| 12 | Image Plane | — | Plano | — | — | — | — | — |

Note:
Reference wavelength is d-line 587.6 nm, and ASP represents aspheric.

As for the parameters of the aspheric surfaces, reference is made to Table 2-2 below.

TABLE 2-2

| Aspheric Coefficients | | | | |
|---|---|---|---|---|
| Surface# | 1 | 2 | 4 | 5 |
| k = | −2.7718E−01 | −1.0000E+01 | 0.0000E+00 | −2.7273E+00 |
| A4 = | −3.5277E−03 | −1.2189E−01 | 9.1623E−03 | 1.5670E−01 |
| A6 = | 2.8440E−02 | 9.4036E−02 | 1.8989E−01 | 2.0134E−01 |
| A8 = | −1.5325E−01 | −5.9171E−02 | −1.1625E−01 | −2.8523E−01 |
| A10 = | 2.0241E−01 | −1.1397E−01 | −1.3306E−01 | 3.5630E−01 |
| A12 = | −1.8569E−01 | 7.0950E−02 | 2.0031E−01 | −1.2371E−01 |

| Surface# | 6 | 7 | 8 | 9 |
|---|---|---|---|---|
| k = | −8.3075E−01 | −2.8208E+00 | 3.0000E+00 | −1.2857E+01 |
| A4 = | −4.0871E−02 | −1.7798E−01 | −8.2639E−02 | −7.2268E−02 |
| A6 = | −1.5752E−01 | 5.3502E−02 | 3.4985E−02 | 2.6211E−02 |
| A8 = | 3.3238E−01 | −1.0268E−02 | −5.3215E−03 | −8.5113E−03 |
| A10 = | −4.7573E−01 | 1.6074E−02 | −2.0649E−03 | 1.4520E−03 |
| A12 = | 5.5703E−01 | 3.1868E−03 | −3.6888E−05 | −8.9987E−05 |
| A14 = | −3.7006E−01 | −4.2106E−03 | 2.0264E−04 | −1.2586E−05 |
| A16 = | 1.0149E−01 | 5.2861E−04 | −7.3636E−06 | 1.5215E−06 |

The content of Table 2-3 may be deduced from Table 2-1.

TABLE 2-3

| Embodiment 2 | | | |
|---|---|---|---|
| f (mm) | 4.22 | $(R_7 + R_8)/(R_7 − R_8)$ | 0.96 |
| Fno | 2.60 | $Dsr_4/Dr_1r_4$ | 0.36 |
| HFOV(deg.) | 33.7 | $Dr_1r_4/T_{23}$ | 0.91 |
| $V_1/V_2$ | 2.40 | $|SAG_{32}|/CT_3$ | 1.26 |
| $CT_2$ (mm) | 0.240 | $f_1/f_2$ | −0.430 |
| $T_{23}/CT_3$ | 1.679 | $f/f_1 + f/f_2 + f/f_3 + f/f_4$ | 0.802 |
| $R_1/R_2$ | 0.11 | — | — |

The Third Embodiment (Embodiment 3)

Figure 3A:
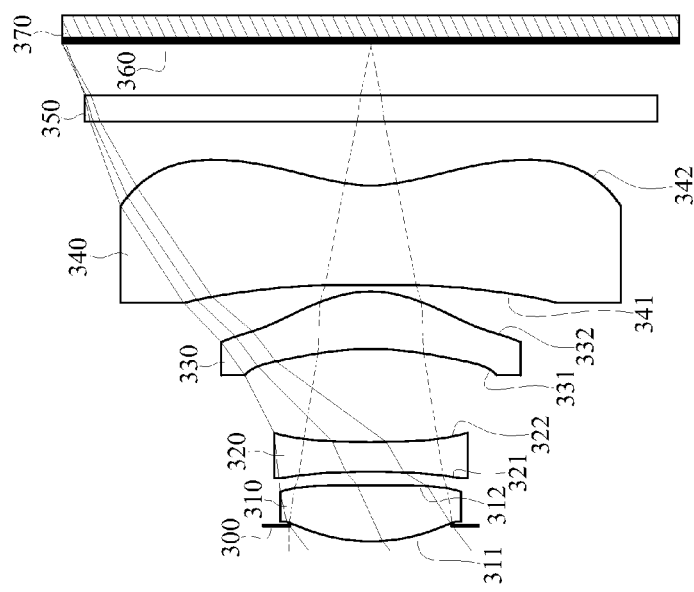
FIG. 3A is a schematic structural view of a third embodiment of an optical lens assembly for image taking.

Referring to FIGS. 3A to 3D, the optical lens assembly for image taking 3 of the third embodiment comprises, from an object side to an image side along an optical axis in sequence, an aperture stop 300, a first lens element 310, a second lens element 320, a third lens element 330, a fourth lens element 340, an IR-cut filter 350 and an image plane 360 including an image sensor 370.

The first lens element 310 made of plastic with positive refractive power having a convex object-side surface 311 at a paraxial region, a convex image-side surface 312 at a paraxial region, and the object-side and image-side surfaces 311 and 312 thereof being aspheric. The second lens element 320 made of plastic with negative refractive power having an object-side surface 321 being concave at a paraxial region and convex at a peripheral region, a concave image-side surface 322 at a paraxial region, and the object-side and image-side surfaces 321 and 322 thereof being aspheric. The third lens element 330 made of plastic with positive refractive power having a concave object-side surface 331 at a paraxial region, a convex image-side surface 332 at a paraxial region, and the object-side and image-side surfaces 331 and 332 thereof being aspheric. The fourth lens element 340 made of plastic with negative refractive power having a concave object-side surface 341 at a paraxial region, an image-side surface 342 being concave at a paraxial region and convex at a peripheral region, and the object-side and image-side surfaces 341 and 342 thereof being aspheric.

The detailed data of the optical lens assembly for image taking 3 is as shown in Table 3-1 below.

TABLE 3-1

Embodiment 3
f = 3.16 mm, Fno = 2.50, HFOV = 37.2 deg.

| Surface # | | Curvature radius (mm) | Thickness (mm) | Material | Index | Abbe # | Focal length (mm) |
|---|---|---|---|---|---|---|---|
| 0 | Object | — | Plano | Infinity | — | — | — |
| 1 | Ape. Stop | — | Plano | −0.124 | — | — | — |
| 2 | Lens 1 | 1.398 | ASP | 0.437 | Plastic | 1.544 | 55.9 | 2.41 |
| 3 | | −18.784 | ASP | 0.106 | | | | |
| 4 | Lens 2 | −4.907 | ASP | 0.230 | Plastic | 1.634 | 23.8 | −5.10 |
| 5 | | 9.668 | ASP | 0.725 | | | | |
| 6 | Lens 3 | −2.301 | ASP | 0.448 | Plastic | 1.544 | 55.9 | 2.29 |
| 7 | | −0.864 | ASP | 0.050 | | | | |
| 8 | Lens 4 | −92.625 | ASP | 0.775 | Plastic | 1.544 | 55.9 | −2.04 |
| 9 | | 1.125 | ASP | 0.500 | | | | |
| 10 | IR-cut filter | — | Plano | 0.200 | Glass | 1.517 | 64.2 | — |
| 11 | | — | Plano | 0.404 | | | | |
| 12 | Image Plane | — | Plano | — | — | — | — |

Note:
Reference wavelength is d-line 587.6 nm, and ASP represents aspheric.

As for the parameters of the aspheric surfaces, reference is made to Table 3-2 below.

TABLE 3-2

Aspheric Coefficients

| Surface# | 2 | 3 | 4 | 5 |
|---|---|---|---|---|
| k = | −3.1348E−01 | −1.0000E+01 | 8.0573E−01 | −9.4103E−01 |
| A4 = | −2.6398E−03 | −3.3758E−03 | 1.2856E−01 | 1.8792E−01 |
| A6 = | 7.1184E−02 | −1.6505E−01 | −2.9274E−01 | −1.5053E−01 |
| A8 = | −3.9064E−01 | −5.3144E−01 | −5.9578E−01 | −3.2201E−01 |
| A10 = | 7.1001E−01 | 4.8907E−01 | 1.2917E+00 | 9.8931E−01 |
| A12 = | −1.2552E+00 | −8.9056E−02 | 4.1486E−02 | −4.0552E−01 |

| Surface# | 6 | 7 | 8 | 9 |
|---|---|---|---|---|
| k = | −3.8312E+00 | −3.9375E+00 | −1.0000E+01 | −7.8287E+00 |
| A4 = | 4.3031E−02 | −1.8316E−01 | −1.1156E−01 | −1.0225E−01 |
| A6 = | −1.3068E−01 | 2.8895E−01 | 7.7127E−02 | 5.3651E−02 |
| A8 = | 9.3787E−01 | −4.5535E−02 | −1.0326E−02 | −2.2803E−02 |
| A10 = | −2.4594E+00 | 8.9727E−03 | −6.9155E−03 | 4.9977E−03 |
| A12 = | 3.1468E+00 | −2.4744E−02 | −2.2103E−04 | −3.8027E−04 |
| A14 = | −1.9753E+00 | −5.5294E−02 | 1.2223E−03 | −6.7563E−05 |
| A16 = | 3.9906E−01 | 3.5069E−02 | −1.8080E−04 | 1.1080E−05 |

The content of Table 3-3 may be deduced from Table 3-1.

TABLE 3-3

| Embodiment 3 | | | |
|---|---|---|---|
| f (mm) | 3.16 | $(R_7 + R_8)/(R_7 - R_8)$ | 0.98 |
| Fno | 2.50 | $Dsr_4/Dr_1r_4$ | 0.84 |
| HFOV(deg.) | 37.2 | $Dr_1r_4/T_{23}$ | 1.07 |
| $V_1/V_2$ | 2.35 | $|SAG_{32}|/CT_3$ | 0.88 |
| $CT_2$ (mm) | 0.230 | $f_1/f_2$ | −0.472 |
| $T_{23}/CT_3$ | 1.618 | $f/f_1 + f/f_2 + f/f_3 + f/f_4$ | 0.521 |
| $R_1/R_2$ | −0.07 | — | — |

The Fourth Embodiment (Embodiment 4)

Figure 4A:
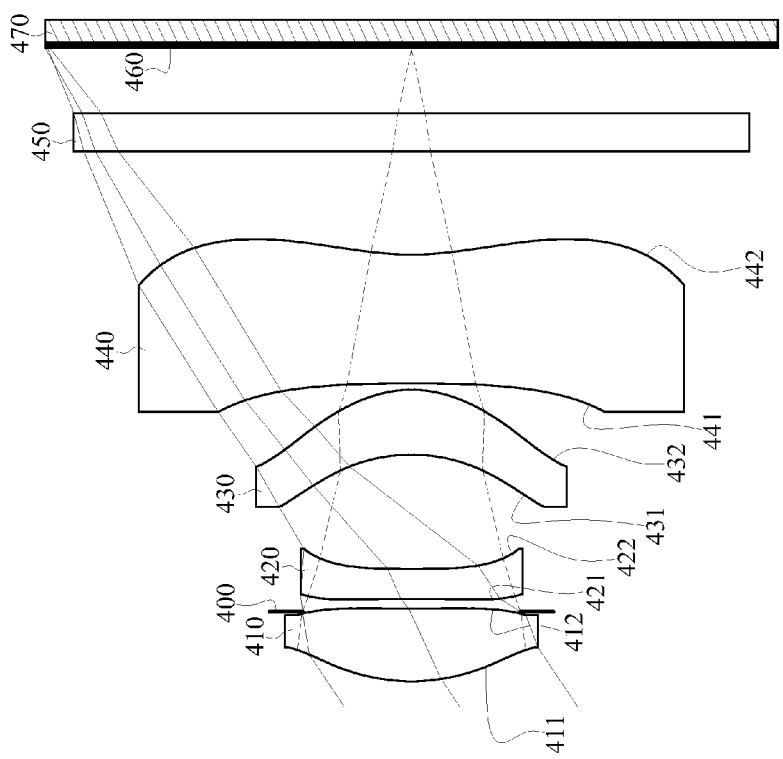
FIG. 4A is a schematic structural view of a fourth embodiment of an optical lens assembly for image taking.

Referring to FIGS. 4A to 4D, the optical lens assembly for image taking 4 of the fourth embodiment comprises, from an object side to an image side along an optical axis in sequence, a first lens element 410, an aperture stop 400, a second lens element 420, a third lens element 430, a fourth lens element 440, an IR-cut filter 450 and an image plane 460 including an image sensor 470.

The first lens element 410 made of plastic with positive refractive power having a convex object-side surface 411 at a paraxial region, a concave image-side surface 412 at a paraxial region, and the object-side and image-side surfaces 411 and 412 thereof being aspheric. The second lens element 420 made of plastic with negative refractive power having an object-side surface 421 being concave at a paraxial region and convex at a peripheral region, a concave image-side surface 422 at a paraxial region, and the object-side and image-side surfaces 421 and 422 thereof being aspheric. The third lens element 430 made of plastic with positive refractive power having a concave object-side surface 431 at a paraxial region, a convex image-side surface 432 at a paraxial region, and the object-side and image-side surfaces 431 and 432 thereof being aspheric. The fourth lens element 440 made of plastic with negative refractive power having a concave object-side surface 441 at a paraxial region, an image-side surface 442 being concave at a paraxial region and convex at a peripheral region, and the object-side and image-side surfaces 441 and 442 thereof being aspheric.

The detailed data of the optical lens assembly for image taking 4 is as shown in Table 4-1 below.

TABLE 4-1

Embodiment 4
f = 4.24 mm, Fno = 2.40, HFOV = 33.6 deg.

| Surface # | | Curvature radius (mm) | Thickness (mm) | Material | Index | Abbe # | Focal length (mm) |
|---|---|---|---|---|---|---|---|
| 0 | Object | — | Plano | Infinity | — | — | — |
| 1 | Lens 1 | 1.477 | ASP | 0.564 | Plastic | 1.544 | 55.9 | 3.02 |
| 2 | | 12.628 | ASP | −0.025 | | | | |
| 3 | Ape. Stop | — | Plano | 0.101 | — | — | — | |
| 4 | Lens 2 | −16.191 | ASP | 0.230 | Plastic | 1.650 | 21.4 | −9.27 |
| 5 | | 9.639 | ASP | 0.887 | | | | |
| 6 | Lens 3 | −1.278 | ASP | 0.503 | Plastic | 1.544 | 55.9 | 3.98 |
| 7 | | −0.915 | ASP | 0.050 | | | | |
| 8 | Lens 4 | −16.008 | ASP | 0.996 | Plastic | 1.535 | 56.3 | −3.51 |
| 9 | | 2.174 | ASP | 0.800 | | | | |
| 10 | IR-cut filter | — | Plano | 0.300 | Glass | 1.517 | 64.2 | — |
| 11 | | — | Plano | 0.499 | | | | |
| 12 | Image Plane | — | Plano | — | — | — | — | |

Note:
Reference wavelength is d-line 587.6 nm, and ASP represents aspheric.

As for the parameters of the aspheric surfaces, reference is made to Table 4-2 below.

TABLE 4-2

| Aspheric Coefficients | | | | |
|---|---|---|---|---|
| Surface# | 1 | 2 | 4 | 5 |
| k = | −3.9600E−01 | −1.0000E+00 | −1.0000E+00 | −1.0000E+01 |
| A4 = | −1.0349E−03 | −1.5629E−01 | −1.2051E−02 | 1.4376E−01 |
| A6 = | −3.3372E−02 | 6.1381E−02 | 2.4071E−01 | 2.2513E−01 |
| A8 = | 2.9815E−02 | 1.4497E−04 | −1.7614E−01 | −2.0940E−01 |
| A10 = | −1.1699E−01 | −8.2061E−02 | 8.5465E−02 | 1.6181E−01 |
| A12 = | 1.6869E−02 | 3.4773E−02 | 1.7518E−02 | 1.1102E−02 |
| Surface# | 6 | 7 | 8 | 9 |
| k = | −1.2732E+00 | −2.4919E+00 | 0.0000E+00 | −1.4828E+01 |
| A4 = | −5.4571E−02 | −1.3836E−01 | −3.6118E−02 | −5.8863E−02 |
| A6 = | −1.4167E−01 | 3.2188E−02 | 8.9260E−03 | 2.1901E−02 |
| A8 = | 4.3308E−01 | 2.9626E−02 | −2.7124E−04 | −7.6481E−03 |
| A10 = | −5.1869E−01 | 2.2476E−02 | −1.7875E−03 | 1.4801E−03 |

TABLE 4-2-continued

| Aspheric Coefficients | | | | |
|---|---|---|---|---|
| A12 = | 5.0188E−01 | −8.8402E−03 | −2.0505E−04 | −1.4250E−04 |
| A14 = | −3.4547E−01 | −1.0509E−02 | 2.1570E−04 | −7.5030E−07 |
| A16 = | 1.0990E−01 | 4.6847E−03 | 2.5326E−06 | 7.7316E−07 |

The content of Table 4-3 may be deduced from Table 4-1.

TABLE 4-3

| Embodiment 4 | | | |
|---|---|---|---|
| f (mm) | 4.24 | $(R_7 + R_8)/(R_7 - R_8)$ | 0.76 |
| Fno | 2.40 | $Dsr_4/Dr_1r_4$ | 0.38 |
| HFOV(deg.) | 33.6 | $Dr_1r_4/T_{23}$ | 0.98 |
| $V_1/V_2$ | 2.61 | $|SAG_{32}|/CT_3$ | 1.19 |
| $CT_2$ (mm) | 0.230 | $f_1/f_2$ | −0.326 |
| $T_{23}/CT_3$ | 1.763 | $f/f_1 + f/f_2 + f/f_3 + f/f_4$ | 0.804 |
| $R_1/R_2$ | 0.12 | — | — |

The Fifth Embodiment (Embodiment 5)

Figure 5A:
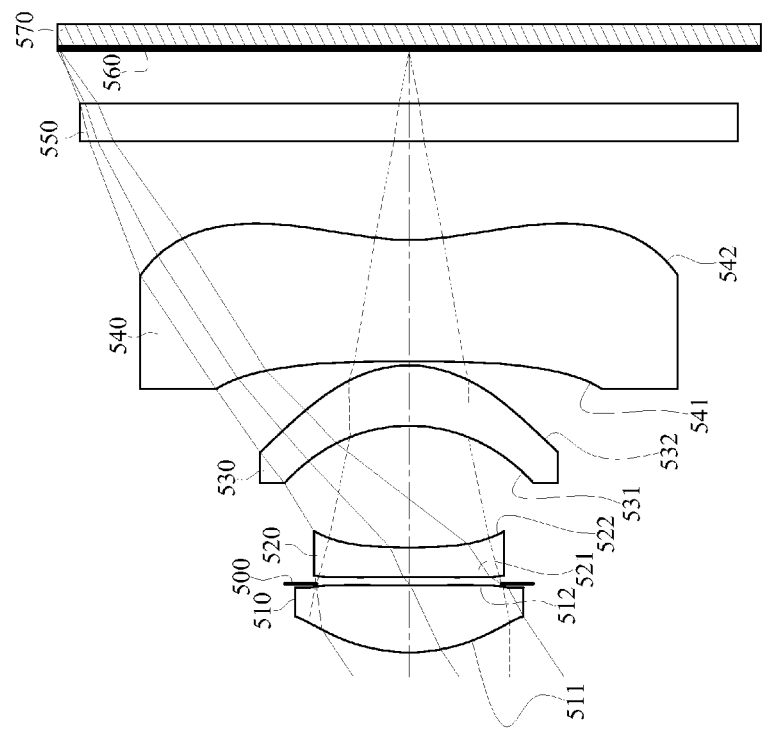
FIG. 5A is a schematic structural view of a fifth embodiment of an optical lens assembly for image taking.

Referring to FIGS. 5A to 5D, the optical lens assembly for image taking 5 of the fifth embodiment comprises, from an object side to an image side along an optical axis in sequence, a first lens element 510, an aperture stop 500, a second lens element 520, a third lens element 530, a fourth lens element 540, an IR-cut filter 550 and an image plane 560 including an image sensor 570.

The first lens element 510 made of plastic with positive refractive power having a convex object-side surface 511 at a paraxial region, a concave image-side surface 512 at a paraxial region, and the object-side and image-side surfaces 511 and 512 thereof being aspheric. The second lens element 520 made of plastic with negative refractive power having an object-side surface 521 being concave at a paraxial region and convex at a peripheral region, a concave image-side surface 522 at a paraxial region, and the object-side and image-side surfaces 521 and 522 thereof being aspheric. The third lens element 530 made of plastic with positive refractive power having a concave object-side surface 531 at a paraxial region, a convex image-side surface 532 at a paraxial region, and the object-side and image-side surfaces 531 and 532 thereof being aspheric. The fourth lens element 540 made of plastic with negative refractive power having a concave object-side surface 541 at a paraxial region, an image-side surface 542 being concave at a paraxial region and convex at a peripheral region, and the object-side and image-side surfaces 541 and 542 thereof being aspheric.

The detailed data of the optical lens assembly for image taking 5 is as shown in Table 5-1 below.

Table 5-1

| Embodiment 5 f = 4.21 mm, Fno = 2.60, HFOV = 33.8 deg. | | | | | | | |
|---|---|---|---|---|---|---|---|
| Surface # | | Curvature Radius (mm) | Thickness (mm) | Material | Index | Abbe # | Focal length (mm) |
| 0 | Object | — | Plano | Infinity | — | — | — |
| 1 | Lens 1 | 1.396 | ASP | 0.541 | Plastic | 1.544 | 55.9 | 2.83 |
| 2 | | 12.987 | ASP | 0.012 | | | | |
| 3 | Ape. Stop | — | Plano | 0.054 | — | — | — | — |
| 4 | Lens 2 | −21.882 | ASP | 0.240 | Plastic | 1.640 | 23.3 | −6.81 |
| 5 | | 5.468 | ASP | 0.982 | | | | |
| 6 | Lens 3 | −1.327 | ASP | 0.488 | Plastic | 1.544 | 55.9 | 4.08 |
| 7 | | −0.938 | ASP | 0.030 | | | | |
| 8 | Lens 4 | −96.154 | ASP | 0.983 | Plastic | 1.544 | 55.9 | −3.68 |
| 9 | | 2.053 | ASP | 0.800 | | | | |
| 10 | IR-cut filter | — | Plano | 0.300 | Glass | 1.517 | 64.2 | — |
| 11 | | — | Plano | 0.423 | | | | |
| 12 | Image Plane | — | Plano | — | — | — | — | — |

Note:
Reference wavelength is d-line 587.6 nm, and ASP represents aspheric.

As for the parameters of the aspheric surfaces, reference is made to Table 5-2 below.

TABLE 5-2

| Aspheric Coefficients | | | | |
|---|---|---|---|---|
| Surface# | 1 | 2 | 4 | 5 |
| k = | −2.1472E−01 | 1.3365E+01 | 2.0000E+01 | −5.0570E+00 |
| A4 = | −7.0134E−03 | −1.3245E−01 | −2.7741E−03 | 1.5294E−01 |
| A6 = | 3.3523E−02 | 1.2273E−01 | 2.2929E−01 | 2.1296E−01 |
| A8 = | −1.6331E−01 | −7.5352E−02 | −1.8507E−01 | −3.3739E−01 |
| A10 = | 2.1611E−01 | −1.2271E−01 | −6.3417E−02 | 4.2148E−01 |
| A12 = | −1.8981E−01 | 8.0174E−02 | 1.6503E−01 | −1.5564E−01 |

TABLE 5-2-continued

| Aspheric Coefficients | | | | |
|---|---|---|---|---|
| Surface# | 6 | 7 | 8 | 9 |
| k = | −8.0936E−01 | −2.5573E+00 | −2.0000E+01 | −1.3381E+01 |
| A4 = | −4.1480E−02 | −1.6444E−01 | −6.4761E−02 | −5.6728E−02 |
| A6 = | −1.8101E−01 | 3.2789E−02 | 2.9318E−02 | 1.8387E−02 |
| A8 = | 3.9674E−01 | −3.5037E−03 | −4.6741E−03 | −5.8367E−03 |
| A10 = | −5.4309E−01 | 3.5609E−02 | −1.9021E−03 | 1.0848E−03 |
| A12 = | 5.5613E−01 | 1.4681E−04 | 1.6523E−04 | −1.1383E−04 |
| A14 = | −3.0714E−01 | −1.7004E−02 | 1.1377E−04 | 2.3914E−06 |
| A16 = | 4.9077E−02 | 4.6559E−03 | −1.1852E−05 | 2.1022E−07 |

The content of Table 5-3 may be deduced from Table 5-1.

TABLE 5-3

| Embodiment 5 | | | |
|---|---|---|---|
| f (mm) | 4.21 | $(R_7 + R_8)/(R_7 − R_8)$ | 0.96 |
| Fno | 2.60 | $Dsr_4/Dr_1r_4$ | 0.35 |
| HFOV(deg.) | 33.8 | $Dr_1r_4/T_{23}$ | 0.86 |
| $V_1/V_2$ | 2.40 | $|SAG_{32}|/CT_3$ | 1.44 |
| $CT_2$ (mm) | 0.240 | $f_1/f_2$ | −0.415 |
| $T_{23}/CT_3$ | 2.012 | $f/f_1 + f/f_2 + f/f_3 + f/f_4$ | 0.760 |
| $R_1/R_2$ | 0.11 | — | — |

The Sixth Embodiment (Embodiment 6)

Figure 6A:
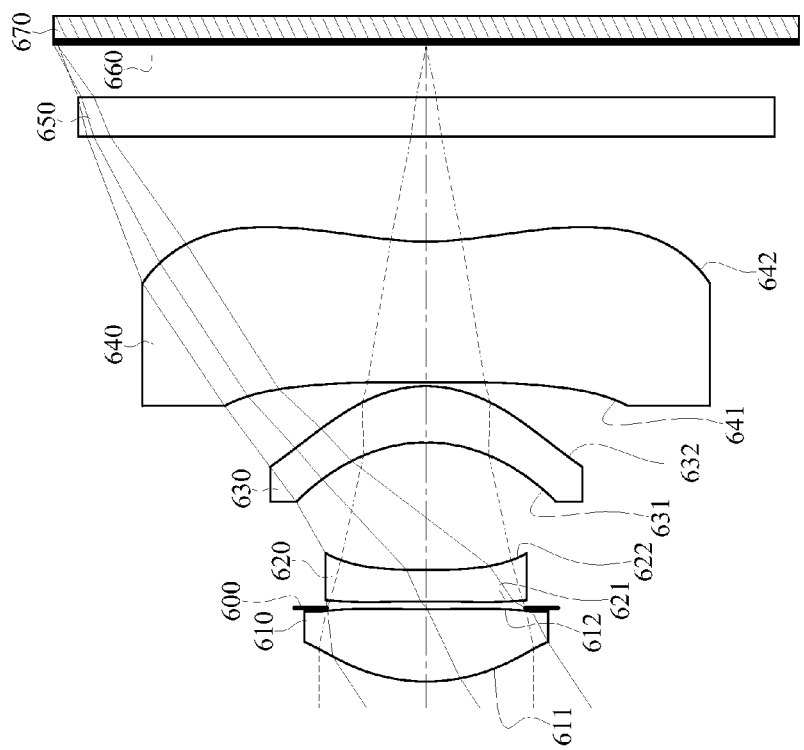
FIG. 6A is a schematic structural view of a sixth embodiment of an optical lens assembly for image taking.

Referring to FIGS. 6A to 6D, the optical lens assembly for image taking 6 of the sixth embodiment comprises, from an object side to an image side along an optical axis in sequence, a first lens element 610, an aperture stop 600, a second lens element 620, a third lens element 630, a fourth lens element 640, an IR-cut filter 650 and an image plane 660 including an image sensor 670.

The first lens element 610 made of plastic with positive refractive power having a convex object-side surface 611 at a paraxial region, a concave image-side surface 612 at a paraxial region, and the object-side and image-side surfaces 611 and 612 thereof being aspheric. The second lens element 620 made of plastic with negative refractive power having an object-side surface 621 being concave at a paraxial region and convex at a peripheral region, a concave image-side surface 622 at a paraxial region, and the object-side and image-side surfaces 621 and 622 thereof being aspheric. The third lens element 630 made of plastic with positive refractive power having a concave object-side surface 631 at a paraxial region, a convex image-side surface 632 at a paraxial region, and the object-side and image-side surfaces 631 and 632 thereof being aspheric. The fourth lens element 640 made of plastic with negative refractive power having a concave object-side surface 641 at a paraxial region, an image-side surface 642 being concave at a paraxial region and convex at a peripheral region, and the object-side and image-side surfaces 641 and 642 thereof being aspheric.

The detailed data of the optical lens assembly for image taking 6 is as shown in Table 6-1 below.

TABLE 6-1

Embodiment 6
f = 4.25 mm, Fno = 2.60, HFOV = 33.6 deg.

| Surface # | | Curvature Radius (mm) | Thickness (mm) | Material | Index | Abbe # | Focal length (mm) |
|---|---|---|---|---|---|---|---|
| 0 | Object | — | Plano | Infinity | — | — | — |
| 1 | Lens 1 | 1.382 | ASP | 0.551 | Plastic | 1.544 | 55.9 | 2.80 |
| 2 | | 12.987 | ASP | 0.011 | | | | |
| 3 | Ape. Stop | — | Plano | 0.048 | — | — | — | |
| 4 | Lens 2 | −21.882 | ASP | 0.240 | Plastic | 1.640 | 23.3 | −6.93 |
| 5 | | 5.583 | ASP | 0.973 | | | | |
| 6 | Lens 3 | −1.196 | ASP | 0.428 | Plastic | 1.544 | 55.9 | 5.04 |
| 7 | | −0.938 | ASP | 0.030 | | | | |
| 8 | Lens 4 | −118.906 | ASP | 1.072 | Plastic | 1.544 | 55.9 | −4.28 |
| 9 | | 2.381 | ASP | 0.800 | | | | |
| 10 | IR-cut filter | — | Plano | 0.300 | Glass | 1.517 | 64.2 | — |
| 11 | | — | Plano | 0.401 | | | | |
| 12 | Image Plane | — | Plano | — | — | — | — | |

Note:
Reference wavelength is d-line 587.6 nm, and ASP represents aspheric.

As for the parameters of the aspheric surfaces, reference is made to Table 6-2 below.

TABLE 6-2

Aspheric Coefficients

| Surface# | 1 | 2 | 4 | 5 |
|---|---|---|---|---|
| k = | −1.9776E−01 | −2.0000E+01 | 2.0000E+01 | −6.9385E+00 |
| A4 = | −6.3982E−03 | −1.3692E−01 | −1.0716E−02 | 1.5136E−01 |
| A6 = | 3.3612E−02 | 1.4112E−01 | 2.4027E−01 | 2.0873E−01 |
| A8 = | −1.5938E−01 | −9.0475E−02 | −1.9312E−01 | −3.3568E−01 |
| A10 = | 2.1378E−01 | −1.0933E−01 | −5.1506E−02 | 4.2625E−01 |
| A12 = | −1.8695E−01 | 7.2423E−02 | 1.5526E−01 | −1.5508E−01 |

| Surface# | 6 | 7 | 8 | 9 |
|---|---|---|---|---|
| k = | −9.1034E−01 | −2.5635E+00 | −2.0000E+01 | −1.5988E+01 |
| A4 = | −3.4900E−02 | −1.6160E−01 | −4.7728E−02 | −5.3787E−02 |
| A6 = | −1.4704E−01 | 5.2202E−02 | 2.0242E−02 | 1.7478E−02 |
| A8 = | 4.3643E−01 | 2.1599E−02 | −4.0349E−03 | −5.7351E−03 |
| A10 = | −5.8370E−01 | 3.8296E−02 | −1.1713E−03 | 1.0845E−03 |
| A12 = | 5.4398E−01 | −1.2525E−02 | 1.2895E−04 | −1.2011E−04 |
| A14 = | −2.9231E−01 | −2.5665E−02 | 3.6585E−05 | 4.7827E−06 |
| A16 = | 3.3752E−02 | 1.0648E−02 | 2.6279E−06 | −6.6075E−08 |

The content of Table 6-3 may be deduced from Table 6-1.

TABLE 6-3

Embodiment 6

| f (mm) | 4.25 | $(R_7 + R_8)/(R_7 - R_8)$ | 0.96 |
|---|---|---|---|
| Fno | 2.60 | $Dsr_4/Dr_1r_4$ | 0.34 |
| HFOV(deg.) | 33.6 | $Dr_1r_4/T_{23}$ | 0.87 |
| $V_1/V_2$ | 2.40 | $|SAG_{32}|/CT_3$ | 1.44 |
| $CT_2$ (mm) | 0.240 | $f_1/f_2$ | −0.403 |
| $T_{23}/CT_3$ | 2.273 | $f/f_1 + f/f_2 + f/f_3 + f/f_4$ | 0.756 |
| $R_1/R_2$ | 0.11 | — | — |

The Seventh Embodiment (Embodiment 7)

Figure 7A:
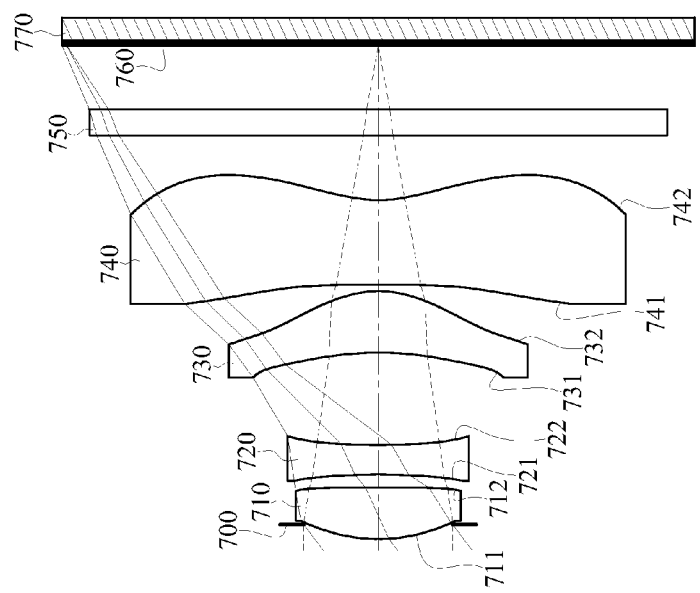
FIG. 7A is a schematic structural view of a seventh embodiment of an optical lens assembly for image taking.

Referring to FIGS. 7A to 7D, the optical lens assembly for image taking 7 of the seventh embodiment comprises, from an object side to an image side along an optical axis in sequence, an aperture stop 700, a first lens element 710, a second lens element 720, a third lens element 730, a fourth lens element 740, an IR-cut filter 750 and an image plane 760 including an image sensor 770.

The first lens element 710 made of plastic with positive refractive power having a convex object-side surface 711 at a paraxial region, a convex image-side surface 712 at a paraxial region, and the object-side and image-side surfaces 711 and 712 thereof being aspheric. The second lens element 720 made of plastic with negative refractive power having an object-side surface 721 being concave at a paraxial region and convex at a peripheral region, a concave image-side surface 722 at a paraxial region, and the object-side and image-side surfaces 721 and 722 thereof being aspheric. The third lens element 730 made of plastic with positive refractive power having a concave object-side surface 731 at a paraxial region, a convex image-side surface 732 at a paraxial region, and the object-side and image-side surfaces 731 and 732 thereof being aspheric. The fourth lens element 740 made of plastic with negative refractive power having a concave object-side surface 741 at a paraxial region, an image-side surface 742 being concave at a paraxial region and convex at a peripheral region, and the object-side and image-side surfaces 741 and 742 thereof being aspheric.

The detailed data of the optical lens assembly for image taking 7 is as shown in Table 7-1 below.

TABLE 7-1

Embodiment 7
f = 3.15 mm, Fno = 2.75, HFOV = 37.2 deg.

| Surface # | | Curvature radius (mm) | Thickness (mm) | Material | Index | Abbe # | Focal length (mm) |
|---|---|---|---|---|---|---|---|
| 0 | Object | — | Plano | Infinity | — | — | — |
| 1 | Ape. Stop | — | Plano | −0.111 | — | — | — |
| 2 | Lens 1 | 1.318 | ASP | 0.398 | Plastic | 1.544 | 55.9 | 2.37 |
| 3 | | −49.378 | ASP | 0.100 | | | | |
| 4 | Lens 2 | −4.695 | ASP | 0.230 | Plastic | 1.634 | 23.8 | −4.79 |
| 5 | | 8.754 | ASP | 0.711 | | | | |
| 6 | Lens 3 | −2.349 | ASP | 0.473 | Plastic | 1.544 | 55.9 | 1.98 |
| 7 | | −0.792 | ASP | 0.050 | | | | |
| 8 | Lens 4 | −92.593 | ASP | 0.652 | Plastic | 1.544 | 55.9 | −1.82 |
| 9 | | 1.001 | ASP | 0.500 | | | | |
| 10 | IR-cut filter | — | Plano | 0.200 | Glass | 1.517 | 64.2 | — |
| 11 | | — | Plano | 0.490 | | | | |
| 12 | Image Plane | — | Plano | — | — | — | — |

Note:
Reference wavelength is d-line 587.6 nm, and ASP represents aspheric.

As for the parameters of the aspheric surfaces, reference is made to Table 7-2 below.

TABLE 7-3

| Aspheric Coefficients | | | | |
|---|---|---|---|---|
| Surface# | 2 | 3 | 4 | 5 |
| k = | −3.2979E−02 | −2.0000E+01 | 1.0362E+01 | −1.8693E+01 |
| A4 = | 1.1036E−02 | 2.9501E−03 | 1.4679E−01 | 2.1132E−01 |
| A6 = | −4.1949E−02 | −1.7838E−01 | −4.1033E−01 | −1.9723E−01 |
| A8 = | 1.5892E−01 | −5.1364E−01 | −3.6671E−01 | −2.2151E−01 |
| A10 = | −2.9867E−01 | 1.5730E−01 | 1.0063E+00 | 1.0492E+00 |
| A12 = | −1.0314E+00 | 2.5800E−01 | 5.9282E−01 | −3.5248E−01 |
| Surface# | 6 | 7 | 8 | 9 |
| k = | −3.2777E+00 | −3.8478E+00 | −2.0000E+01 | −7.8096E+00 |
| A4 = | 2.4866E−02 | −2.2406E−01 | −1.3951E−01 | −1.1624E−01 |
| A6 = | −7.6117E−02 | 3.3347E−01 | 8.5993E−02 | 5.6522E−02 |
| A8 = | 8.8969E−01 | −5.5267E−02 | −8.3139E−03 | −2.2867E−02 |
| A10 = | −2.4533E+00 | 5.1830E−03 | −6.6480E−03 | 4.9853E−03 |
| A12 = | 3.1386E+00 | −2.5646E−02 | −1.9395E−04 | −3.7455E−04 |
| A14 = | −1.9612E+00 | −5.4484E−02 | 1.1923E−03 | −6.4601E−05 |
| A16 = | 3.9312E−01 | 3.6056E−02 | −2.0899E−04 | 1.1277E−05 |

The content of Table 7-3 may be deduced from Table 7-1.

TABLE 7-3

| Embodiment 7 | | | |
|---|---|---|---|
| f (mm) | 3.15 | $(R_7 + R_8)/(R_7 − R_8)$ | 0.98 |
| Fno | 2.75 | $Dsr_4/Dr_1r_4$ | 0.85 |
| HFOV(deg.) | 37.2 | $Dr_1r_4/T_{23}$ | 1.02 |
| $V_1/V_2$ | 2.35 | $|SAG_{32}|/CT_3$ | 0.87 |
| $CT_2$ (mm) | 0.230 | $f_1/f_2$ | −0.494 |
| $T_{23}/CT_3$ | 1.503 | $f/f_1 + f/f_2 + f/f_3 + f/f_4$ | 0.527 |
| $R_1/R_2$ | −0.03 | — | — |

The Eighth Embodiment (Embodiment 8)

Figure 8A:
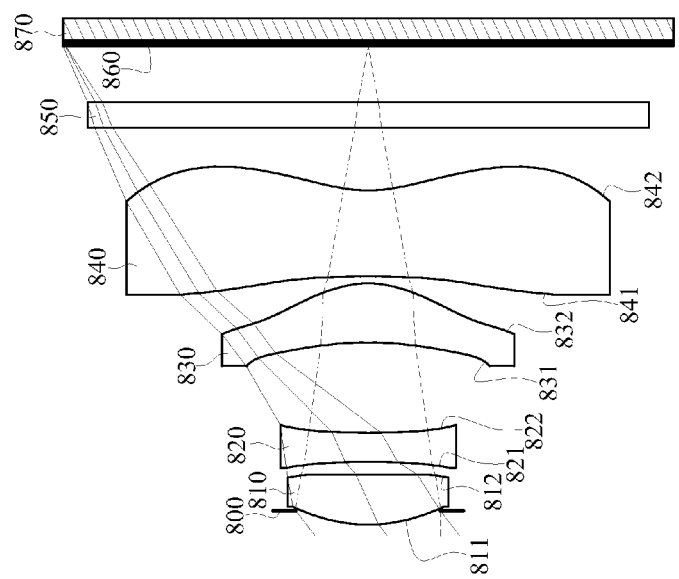
FIG. 8A is a schematic structural view of an eighth embodiment of an optical lens assembly for image taking.

Referring to FIGS. 8A to 8D, the optical lens assembly for image taking 8 of the eighth embodiment comprises, from an object side to an image side along an optical axis in sequence, an aperture stop 800, a first lens element 810, a second lens element 820, a third lens element 830, a fourth lens element 840, an IR-cut filter 850 and an image plane 860 including an image sensor 870.

The first lens element 810 made of plastic with positive refractive power having a convex object-side surface 811 at a paraxial region, a concave image-side surface 812 at a paraxial region, and the object-side and image-side surfaces 811 and 812 thereof being aspheric. The second lens element 820 made of plastic with negative refractive power having an object-side surface 821 being concave at a paraxial region and convex at a peripheral region, a concave image-side surface 822 at a paraxial region, and the object-side and image-side surfaces 821 and 822 thereof being aspheric. The third lens element 830 made of plastic with positive refractive power having a concave object-side surface 831 at a paraxial region, a convex image-side surface 832 at a paraxial region, and the object-side and image-side surfaces 831 and 832 thereof being aspheric. The fourth lens element 840 made of plastic with negative refractive power having a concave object-side surface 841 at a paraxial region, an image-side surface 842 being concave at a paraxial region and convex at a peripheral region, and the object-side and image-side surfaces 841 and 842 thereof being aspheric.

The detailed data of the optical lens assembly for image taking 8 is as shown in Table 8-1 below.

TABLE 8-1

| | | Embodiment 8 f = 3.15 mm, Fno = 2.75, HFOV = 37.2 deg. | | | | | | |
|---|---|---|---|---|---|---|---|---|
| Surface # | | Curvature radius (mm) | | Thickness (mm) | Material | Index | Abbe # | Focal length (mm) |
| 0 | Object | — | Plano | Infinity | — | — | — | — |
| 1 | Ape. Stop | — | Plano | −0.111 | — | — | — | — |
| 2 | Lens 1 | 1.309 | ASP | 0.398 | Plastic | 1.544 | 55.9 | 2.44 |
| 3 | | 94.630 | ASP | 0.100 | | | | |
| 4 | Lens 2 | −5.781 | ASP | 0.230 | Plastic | 1.634 | 23.8 | −5.22 |
| 5 | | 7.874 | ASP | 0.717 | | | | |
| 6 | Lens 3 | −2.730 | ASP | 0.468 | Plastic | 1.544 | 55.9 | 1.95 |
| 7 | | −0.812 | ASP | 0.056 | | | | |
| 8 | Lens 4 | −10.266 | ASP | 0.681 | Plastic | 1.544 | 55.9 | −1.74 |
| 9 | | 1.066 | ASP | 0.500 | | | | |
| 10 | IR-cut filter | — | Plano | 0.200 | Glass | 1.517 | 64.2 | — |
| 11 | | — | Plano | 0.447 | | | | |
| 12 | Image Plane | — | Plano | — | — | — | — | — |

Note:
Reference wavelength is d-line 587.6 nm, and ASP represents aspheric.

As for the parameters of the aspheric surfaces, reference is made to Table 8-2 below.

TABLE 8-2

Aspheric Coefficients

| Surface# | 2 | 3 | 4 | 5 |
|---|---|---|---|---|
| k = | 1.0833E−01 | −5.0000E+01 | 2.1370E+01 | −3.6528E+01 |
| A4 = | −6.3377E−03 | −3.0138E−02 | 5.8259E−02 | 1.5834E−01 |
| A6 = | 2.1210E−02 | −2.8995E−01 | −3.8767E−01 | −1.5233E−01 |
| A8 = | −9.8604E−02 | −5.5070E−02 | 9.1195E−03 | −8.1459E−02 |
| A10 = | −4.5524E−02 | −3.7168E−01 | 5.4832E−01 | 8.8681E−01 |
| A12 = | −1.0314E+00 | 2.5800E−01 | 5.9282E−01 | −3.5777E−01 |

| Surface# | 6 | 7 | 8 | 9 |
|---|---|---|---|---|
| k = | −1.1158E+00 | −4.0041E+00 | −5.0000E+01 | −8.1256E+00 |
| A4 = | 7.5304E−03 | −2.3811E−01 | −1.1624E−01 | −1.1034E−01 |
| A6 = | −4.2445E−02 | 3.7391E−01 | 8.5513E−02 | 5.5210E−02 |
| A8 = | 8.7419E−01 | −6.9691E−02 | −8.4977E−03 | −2.2895E−02 |
| A10 = | −2.4890E+00 | −1.6664E−03 | −6.8785E−03 | 4.9934E−03 |
| A12 = | 3.1703E+00 | −2.6589E−02 | −3.7576E−04 | −3.4126E−04 |
| A14 = | −1.8983E+00 | −5.2638E−02 | 1.1762E−03 | −6.5678E−05 |
| A16 = | 3.1524E−01 | 3.5600E−02 | −1.8478E−04 | 1.0265E−05 |

The content of Table 8-3 may be deduced from Table 8-1.

TABLE 8-3

Embodiment 8

| f (mm) | 3.15 | $(R_7 + R_8)/(R_7 − R_8)$ | 0.81 |
|---|---|---|---|
| Fno | 2.75 | $Dsr_4/Dr_1r_4$ | 0.85 |
| HFOV(deg.) | 37.2 | $|Dr_1r_4|/T_{23}$ | 1.02 |
| $V_1/V_2$ | 2.35 | $|SAG_{32}|/CT_3$ | 0.86 |
| $CT_2$ (mm) | 0.230 | $f_1/f_2$ | −0.466 |
| $T_{23}/CT_3$ | 1.532 | $f/f_1 + f/f_2 + f/f_3 + f/f_4$ | 0.489 |
| $R_1/R_2$ | 0.01 | — | — |

It is to be noted that TABLES 1-8 show different data of the different embodiments; however, the data of the different embodiments are obtained from experiments. Therefore, any optical lens assembly of the same structure is considered to be within the scope of the present disclosure even if it uses different data. The embodiments depicted above and the appended drawings are exemplary and are not intended to limit the scope of the present disclosure.

What is claimed is:

1. An optical lens assembly for image taking comprising, in order from an object side to an image side:
    a first lens element with positive refractive power comprising a convex object-side surface at a paraxial region and an image-side surface;
    a second lens element with negative refractive power comprising a concave object-side surface at a paraxial region and an image-side surface;
    a third lens element with refractive power comprising a concave object-side surface at a paraxial region and a convex image-side surface at a paraxial region; and
    a fourth lens element made of plastic with negative refractive power comprising a concave object-side surface at a paraxial region and a concave image-side surface at a paraxial region wherein at least one of the object-side surface and the image-side surface is aspheric, and the image-side surface is convex at a peripheral region; wherein $T_{23}$ is an axial distance between the second lens element and the third lens element, $CT_3$ is a central thickness of the third lens element, $R_1$ is a curvature radius of the object-side surface of the first lens element, $R_2$ is a curvature radius of the image-side surface of the first lens element, $Dr_1r_4$ is an axial distance between the object-side surface of the first lens element and the image-side surface of the second lens element, and the optical lens assembly for image taking satisfies the following conditions:

$$1.45 < T_{23}/CT_3 < 3.0;$$

$$−0.15 < R_1/R_2 < 0.50; \text{ and}$$

$$0.70 < Dr_1r_4/T_{23} < 1.08.$$

2. The optical lens assembly for image taking according to claim 1, wherein the third lens element has positive refractive power.

3. The optical lens assembly for image taking according to claim 2, wherein $V_1$ is an Abbe number of the first lens element, $V_2$ is an Abbe number of the second lens element, and the optical lens assembly for image taking satisfies the following condition:

$$1.8 < V_1/V_2 < 3.0.$$

4. The optical lens assembly for image taking according to claim 3, further comprising:
    a stop disposed between the first lens element and the second lens element; wherein $Dsr_4$ is an axial distance between the stop and the image-side surface of the second lens element, $Dr_1r_4$ is the axial distance between the object-side surface of the first lens element and the image-side surface of the second lens element, and they satisfy the following condition:

$$0.30 < Dsr_4/Dr_1r_4 < 0.60.$$

5. The optical lens assembly for image taking according to claim 3, wherein the object-side surface of the second lens element is convex at a peripheral region.

6. The optical lens assembly for image taking according to claim 3, wherein $SAG_{32}$ is a distance in parallel with an optical axis from the maximum effective diameter position on the image-side surface of the third lens element to an on-axis vertex on the image-side surface of the third lens element, $CT_3$ is the central thickness of the third lens element, and the optical lens assembly for image taking satisfies the following condition:

$$1.2 < |SAG_{32}|/CT_3 < 1.5.$$

7. The optical lens assembly for image taking according to claim 2, wherein $T_{23}$ is the axial distance between the second lens element and the third lens element, $CT_3$ is the central thickness of the third lens element and the optical lens assembly for image taking satisfies the following condition:

$$1.50 \leq T_{23}/CT_3 < 2.05.$$

8. The optical lens assembly for image taking according to claim 7, wherein $T_{23}$ is the axial distance between the second lens element and the third lens element, $CT_3$ is the central thickness of the third lens element, and the optical lens assembly for image taking satisfies the following condition:

$$1.50 \leq T_{23}/CT_3 < 1.80.$$

9. The optical lens assembly for image taking according to claim 7, wherein $R_7$ is a curvature radius of the object-side surface of the fourth lens element, $R_8$ is a curvature radius of the image-side surface of the fourth lens element and the optical lens assembly for image taking satisfies the following condition:

$$0.75 < (R_7+R_8)/(R_7-R_8) < 1.0.$$

10. The optical lens assembly for image taking according to claim 7, wherein f is a focal length of the optical lens assembly for image taking, $f_1$ is a focal length of the first lens element, $f_2$ is a focal length of the second lens element, $f_3$ is a focal length of the third lens element, $f_4$ is a focal length of the fourth lens element, and the optical lens assembly for image taking satisfies the following condition:

$$0.7 < (f/f_1)+(f/f_2)+(f/f_3)+(f/f_4) < 1.0.$$

11. The optical lens assembly for image taking according to claim 7, wherein $f_1$ is a focal length of the first lens element, $f_2$ is a focal length of the second lens element, and the optical lens assembly for image taking satisfies the following condition:

$$-0.6 < f_1/f_2 < -0.2.$$

12. The optical lens assembly for image taking according to claim 7, wherein $CT_2$ is a central thickness of the second lens element and the optical lens assembly for image taking satisfies the following condition:

$$0.10 \text{ mm} < CT_2 < 0.25 \text{ mm}.$$

13. An optical lens assembly for image taking comprising, in order from an object side to an image side:
 a first lens element with positive refractive power comprising a convex object-side surface at a paraxial region and an image-side surface;
 a second lens element with negative refractive power comprising a concave object-side surface at a paraxial region and an image-side surface;
 a third lens element with refractive power comprising a concave object-side surface at a paraxial region and a convex image-side surface at a paraxial region; and
 a fourth lens element made of plastic with negative refractive power comprising a concave object-side surface at a paraxial region and a concave image-side surface at a paraxial region wherein at least one of the object-side surface and the image-side surface is aspheric, and the image-side surface is convex at a peripheral region; wherein the optical lens assembly for image taking further comprises a stop, $T_{23}$ is an axial distance between the second lens element and the third lens element, $CT_3$ is a central thickness of the third lens element, $R_1$ is a curvature radius of the object-side surface of the first lens element, $R_2$ is a curvature radius of the image-side surface of the first lens element, $Dsr_4$ is an axial distance between the stop and the image-side surface of the second lens element, $Dr_1r_4$ is an axial distance between the object-side surface of the first lens element and the image-side surface of the second lens element, and the optical lens assembly for image taking satisfies the following conditions:

$$1.50 \leq T_{23}/CT_3 < 2.05;$$

$$-0.33 < R_1/R_2 < 0.50;$$

$$0.30 < Dsr_4/Dr_1r_4 < 0.90.$$

14. The optical lens assembly for image taking according to claim 13, wherein the third lens element has positive refractive power, and the image-side surface of the second lens element is concave at a paraxial region.

15. The optical lens assembly for image taking according to claim 14, wherein $T_{23}$ is the axial distance between the second lens element and the third lens element, $CT_3$ is the central thickness of the third lens element, and the optical lens assembly for image taking satisfies the following condition:

$$1.50 \leq T_{23}/CT_3 < 1.80.$$

16. The optical lens assembly for image taking according to claim 15, wherein $V_1$ is an Abbe number of the first lens element, $V_2$ is an Abbe number of the second lens element, and the optical lens assembly for image taking satisfies the following condition:

$$1.8 < V_1/V_2 < 3.0.$$

17. The optical lens assembly for image taking according to claim 15, wherein $f_1$ is a focal length of the first lens element, and $f_2$ is a focal length of the second lens element, and the optical lens assembly for image taking satisfies the following condition:

$$-0.6 < f_1/f_2 < -0.2.$$

18. The optical lens assembly for image taking according to claim 15, wherein $SAG_{32}$ is a distance in parallel with an optical axis from the maximum effective diameter position on the image-side surface of the third lens element to an on-axis vertex on the image-side surface of the third lens element, $CT_3$ is the central thickness of the third lens element, and the optical lens assembly for image taking satisfies the following condition:

$$1.2 < |SAG_{32}|/CT_3 < 1.5.$$

19. The optical lens assembly for image taking according to claim 14, wherein the stop is disposed between the first lens element and the second lens element, $Dsr_4$ is the axial distance between the stop and the image-side surface of the second lens element, $Dr_1r_4$ is the axial distance between the object-side surface of the first lens element and the image-side surface of the second lens element, and the optical lens assembly for image taking satisfies the following condition:

$$0.30 < Dsr_4/Dr_1r_4 < 0.60.$$

20. The optical lens assembly for image taking according to claim 19, wherein $R_7$ is a curvature radius of the object-side surface of the fourth lens element, $R_8$ is a curvature radius of the image-side surface of the fourth lens element, and the optical lens assembly for image taking satisfies the following condition:

$$0.75 < (R_7+R_8)/(R_7-R_8) < 1.0.$$

21. The optical lens assembly for image taking according to claim 19, wherein f is a focal length of the optical lens assembly for image taking, $f_1$ is a focal length of the first lens element, $f_2$ is a focal length of the second lens element, $f_3$ is a focal length of the third lens element, $f_4$ is a focal length of the fourth lens element, and the optical lens assembly for image taking satisfies the following condition:

$$0.7<(f/f_1)+(f/f_2)+(f/f_3)+(f/f_4)<1.0.$$

22. The optical lens assembly for image taking according to claim 19, wherein $R_1$ is the curvature radius of the object-side surface of the first lens element, $R_2$ is the curvature radius of the image-side surface of the first lens element, and the optical lens assembly for image taking satisfies the following condition:

$$-0.15<R_1/R_2<0.50.$$

23. The optical lens assembly for image taking according to claim 19, wherein $CT_2$ is a central thickness of the second lens element, and the optical lens assembly for image taking satisfies the following condition:

$$0.10 \text{ mm}<CT_2<0.25 \text{ mm}.$$

* * * * *